(12) United States Patent
Aloni et al.

(10) Patent No.: US 8,478,907 B1
(45) Date of Patent: Jul. 2, 2013

(54) NETWORK INTERFACE DEVICE SERVING MULTIPLE HOST OPERATING SYSTEMS

(75) Inventors: Eliezer Aloni, Zur Yigal (IL); Kobby Carmona, Hod HaSharon (IL); Shay Mizrachi, Hod HaSharon (IL); Rafi Shalom, Givat Shmuel (IL); Merav Sicron, Kfar Sava (IL); Dov Hirshfeld, Givat Shmuel (IL); Amit Oren, Los Altos Hills, CA (US); Caitlin Bestler, Laguna Hills, CA (US); Uri Tal, Ramat Gan (IL); Uri Elzur, Irvine, CA (US); Kan (Frankie) Fan, Diamond Bar, CA (US); Scott McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 1989 days.

(21) Appl. No.: 11/416,717

(22) Filed: May 3, 2006

Related U.S. Application Data

(63) Continuation-in-part of application No. 11/253,429, filed on Oct. 18, 2005, now abandoned.

(60) Provisional application No. 60/620,098, filed on Oct. 19, 2004, provisional application No. 60/626,283, filed on Nov. 8, 2004, provisional application No. 60/643,335, filed on Jan. 11, 2005.

(51) Int. Cl.
*G03F 15/16* (2006.01)
*G03F 15/177* (2006.01)
*G03F 3/00* (2006.01)

(52) U.S. Cl.
USPC ........... 709/250; 709/225; 719/327; 719/321; 719/324

(58) Field of Classification Search
USPC ........................................... 709/250
See application file for complete search history.

(56) References Cited

U.S. PATENT DOCUMENTS

| | | | | |
|---|---|---|---|---|
| 6,247,060 | B1 * | 6/2001 | Boucher et al. | 709/238 |
| 6,530,078 | B1 * | 3/2003 | Shmid et al. | 717/138 |
| 7,349,999 | B2 * | 3/2008 | Krithivas | 710/33 |
| 7,353,362 | B2 * | 4/2008 | Georgiou et al. | 712/33 |
| 7,395,355 | B2 | 7/2008 | Afergan et al. | |
| 7,412,588 | B2 * | 8/2008 | Georgiou et al. | 712/33 |
| 2002/0049875 | A1 * | 4/2002 | Giora et al. | 710/301 |
| 2002/0107971 | A1 * | 8/2002 | Bailey et al. | 709/231 |
| 2004/0010612 | A1 * | 1/2004 | Pandya | 709/230 |
| 2004/0054813 | A1 * | 3/2004 | Boucher et al. | 709/250 |
| 2004/0054814 | A1 * | 3/2004 | McDaniel | 709/250 |
| 2004/0073703 | A1 | 4/2004 | Boucher et al. | |
| 2004/0168030 | A1 | 8/2004 | Traversat et al. | |

(Continued)

*Primary Examiner* — Saleh Najjar
*Assistant Examiner* — Michael Chao
(74) *Attorney, Agent, or Firm* — Brinks Hofer Gilson & Lione

(57) ABSTRACT

A network interface device for use with a host computer that includes a host processor and a memory, and which is configured to concurrently run a master operating system and at least one virtual operating system. The device includes a bus interface that communicates over a bus with the host processor and the memory, and a network interface, which is coupled to send and receive data packets carrying data over a packet network. A protocol processor is coupled between the bus interface and the network interface so as to convey the data between the network interface and the memory while performing protocol processing on the data packets under instructions from the at least one virtual operating system, while bypassing the master operating system.

22 Claims, 18 Drawing Sheets

U.S. PATENT DOCUMENTS

| | | | |
|---|---|---|---|
| 2004/0221050 A1* | 11/2004 | Smith | 709/230 |
| 2005/0021558 A1* | 1/2005 | Beverly et al. | 707/104.1 |
| 2005/0038946 A1* | 2/2005 | Borden | 710/310 |
| 2005/0165985 A1 | 7/2005 | Vangal et al. | |
| 2005/0190787 A1* | 9/2005 | Kuik et al. | 370/466 |
| 2005/0204366 A1* | 9/2005 | Billau et al. | 719/324 |

\* cited by examiner

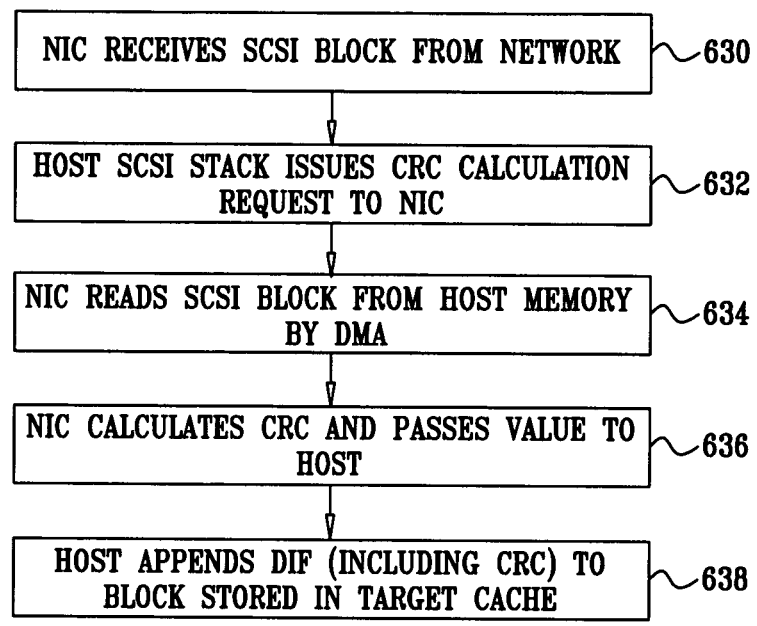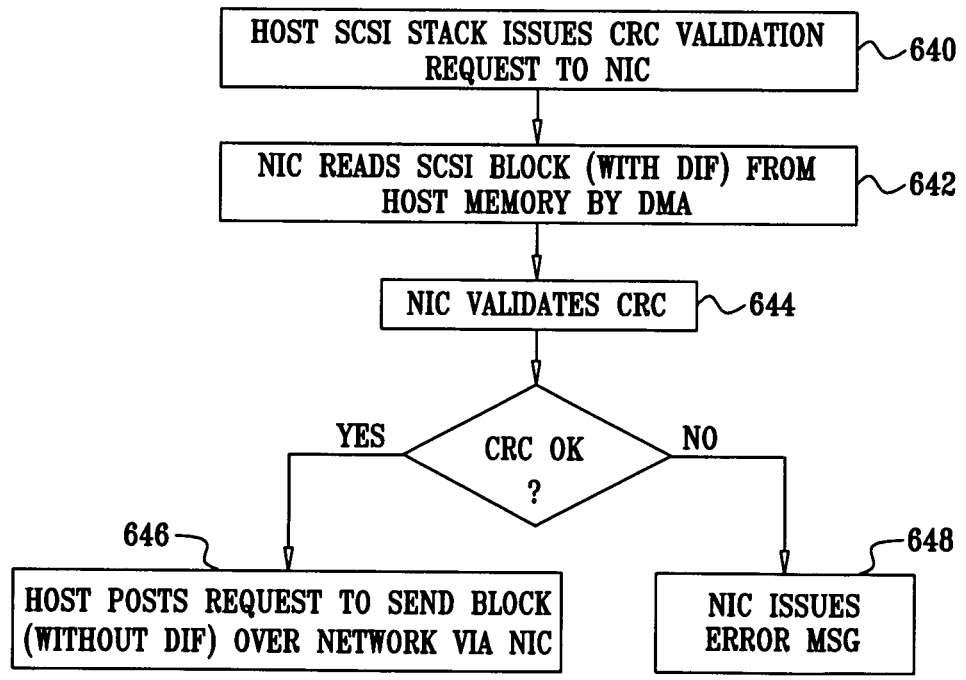

NETWORK INTERFACE DEVICE SERVING MULTIPLE HOST OPERATING SYSTEMS

CROSS-REFERENCE TO RELATED APPLICATIONS/INCORPORATION BY REFERENCE

This application is a continuation-in-part of U.S. application Ser. No. 11/253,429, filed on Oct. 18, 2005 now abandoned, which makes reference to, claims priority to, and claims the benefit of:
U.S. Provisional Patent Application Ser. No. 60/620,098, filed Oct. 19, 2004;
U.S. Provisional Patent Application Ser. No. 60/626,283, filed Nov. 8, 2004; and
U.S. Provisional Patent Application Ser. No. 60/643,335, filed Jan. 11, 2005.
This application also makes reference to:
U.S. patent application Ser. No. 11/416,861, filed on May 3, 2006;
U.S. patent application Ser. No. 11/416,918, filed on May 3, 2006;
U.S. patent application Ser. No. 11/416,914 filed on May 3, 2006;
U.S. patent application Ser. No. 11/416,919, filed on May 3, 2006;
U.S. patent application Ser. No. 11/416,817, filed on May 3, 2006;
U.S. patent application Ser. No. 11/416,677, filed on May 3, 2006;
U.S. patent application Ser. No. 11/416,718, filed on May 3, 2006;
U.S. patent application Ser. No. 11/253,429 filed on Oct. 18, 2005;
U.S. patent application Ser. No. 11/253,216 filed on Oct. 18, 2005;
U.S. patent application Ser. No. 11/252,922 filed on Oct. 18, 2005;
U.S. patent application Ser. No. 11/253,245 filed on Oct. 18, 2005;
U.S. patent application Ser. No. 11/253,397 filed on Oct. 18, 2005;
U.S. patent application Ser. No. 11/253,097 filed on Oct. 18, 2005;
U.S. patent application Ser. No. 11/253,215 filed on Oct. 18, 2005;
U.S. patent application Ser. No. 11/253,509 filed on Oct. 18, 2005;
U.S. patent application Ser. No. 11/253,433 filed on Oct. 18, 2005;
U.S. patent application Ser. No. 11/253,480 filed on Oct. 18, 2005;
U.S. patent application Ser. No. 11/253,394 filed on Oct. 18, 2005; and
U.S. patent application Ser. No. 11/253,427 filed on Oct. 18, 2005.
Each of the above stated applications is hereby incorporated herein by reference in its entirety.

FIELD OF THE INVENTION

The present invention relates generally to data network communications, and more specifically to a method and system for a network interface device serving multiple host operating systems.

BACKGROUND OF THE INVENTION

In recent years, the speed of networking hardware has increased by two or three orders of magnitude, enabling packet networks such as Gigabit Ethernet™ and Infini-Band™ to operate at speeds in excess of about 1 Gbps. Network interface adapters for these high-speed networks typically provide dedicated hardware for physical layer and medium access control (MAC) layer processing (Layers 1 and 2 in the Open Systems Interconnect model). Some newer network interface devices are also capable of offloading upper-layer protocols from the host CPU, including network layer (Layer 3) protocols, such as the Internet Protocol (IP), and transport layer (Layer 4) protocols, such as the Transport Control Protocol (TCP) and User Datagram Protocol (UDP), as well as protocols in Layers 5 and above.

Chips having LAN on motherboard (LOM) and network interface card capabilities are already on the market. One such chip comprises an integrated Ethernet transceiver (up to 1000BASE-T) and a PCI, PCI Express or PCI-X bus interface to the host computer and offers the following exemplary upper-layer facilities: TCP offload engine (TOE), remote direct memory access (RDMA), and Internet small computer system interface (iSCSI). A TOE offloads much of the computationally-intensive TCP/IP tasks from a host processor onto the NIC, thereby freeing up host processor resources. TCP offload additionally reduces the host or CPU memory bandwidth that is required. TCP is described in Request for Comments (RFC) 793, published by the Internet Engineering Task Force (IETF). The Microsoft® Windows® operating system provides an Application Programming Interface (API) known as "TCP Chimney," which is defined in the Microsoft Network Design Interface Specification (NDIS), versions 5.2 and 6.0.

A RDMA controller (RNIC) works with applications on the host to move data directly into and out of application memory without CPU intervention. RDMA runs over TCP/IP in accordance with the iWARP protocol stack. RDMA uses remote direct data placement (rddp) capabilities with IP transport protocols, in particular with SCTP, to place data directly from the NIC into application buffers, without intensive host processor intervention. The RDMA protocol utilizes high speed buffer to buffer transfer to avoid the penalty associated with multiple data copying. The Internet engineering task force (IETF) is the governing body that provides up-to-date information on the RDMA protocol. Features of RDMA are described in the following IETF drafts: draft-ieft-rddp-applicability, draft-ietf-rddp-arch, draft-ietf-rddp-ddp, draft-ietf-rddp-mpa, draft-ieff-rdd p-problem-statement, draft-ietf-rddp-rdma-concerns, draft-ietf-rddp-rdmap, draft-ieff-rddp-security, and draft-hilland-rddp-verbs.

An iSCSI controller emulates SCSI block storage protocols over an IP network. Implementations of the iSCSI protocol may run over either TCP/IP or over RDMA, the latter of which may be referred to as iSCSI extensions over RDMA (iSER). The iSCSI protocol is described in IETF RFC 3720. The RDMA consortium is the governing body that provides up-to-date information on the iSER protocol. Information for iSER is described in IETF draft-ko-iwarp-iser-v1. The above-mentioned IETF documents are incorporated herein by reference. They are available at www.ietf.org.

These and other advantages, aspects and novel features of the present invention, as well as details of an illustrated embodiment thereof, will be more fully understood from the following description and drawings.

SUMMARY OF THE INVENTION

A system and/or method is provided for a method and system for a network interface device serving multiple host operating systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 18A is a flow chart that illustrates an exemplary method for DIF computation that can be used when host receives a block of data as the SCSI target connected to a SCSI initiator, in accordance with an embodiment of the present invention;

FIG. 18B is a flow chart that illustrates an exemplary method for DIF computation that can be used when host is to transmit a block of data as the SCSI target, connected to a SCSI initiator, in accordance with another embodiment of the present invention;

DETAILED DESCRIPTION OF THE INVENTION

System Overview

Figure 1:
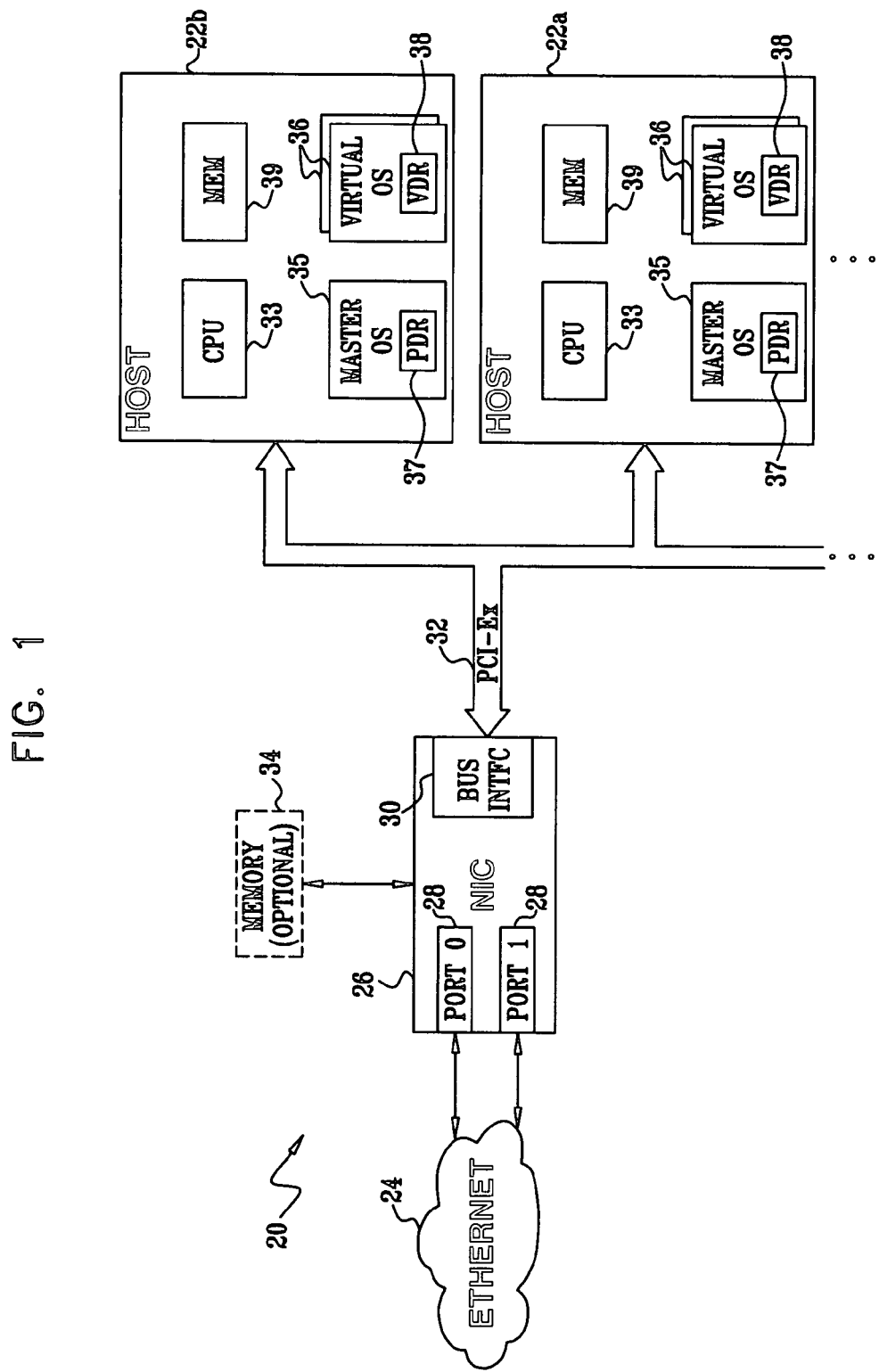
FIG. 1 is a block diagram that illustrates an exemplary computer communication system, which may be utilized in accordance with an embodiment of the present invention.

Certain embodiments of the invention may be found in a method and system for a method and system for a network interface device serving multiple host operating systems. Aspects of the method and system may comprise a network interface device for use with a host computer that comprises a host processor and a memory, and which is configured to concurrently run a master operating system and at least one virtual operating system. The network interface device comprises a bus interface that communicates over a bus with the host processor and the memory, and a network interface, which is coupled to send and receive data packets carrying data over a packet network. A protocol processor is coupled between the bus interface and the network interface so as to convey the data between the network interface and the memory while performing protocol processing on the data packets under instructions from the at least one virtual operating system, while bypassing the master operating system.

Ethernet LANs in the next generation will operate at wire speeds up to 10 Gbps. As a result, the LAN speed will approach the internal bus speed of the hosts that are connected to the LAN. For example, the PCI Express® (also referred to as "PCI-Ex") bus in the widely-used 8× configuration operates at 16 Gbps, meaning that the LAN speed will be more than half the bus speed. For a network interface chip to support communication at the full wire speed, while also performing protocol offload functions, it must therefore not only operate rapidly, but also make very efficient use of the host bus. In particular, the bus bandwidth that is used for conveying connection state information between the chip and host memory should be reduced as far as possible. In other words, the chip should be designed for high-speed, low-latency protocol processing while minimizing the volume of data that it sends and receives over the bus and the number of bus operations that it uses for this purpose.

Furthermore, to reduce power consumption, cost and data latency, it is desirable that the network interface chip operate in a memory-free, cut-through mode. "Cut-through mode" means that the network interface chip is configured to begin processing incoming data packets as soon as the chip has received the packet header, without necessarily waiting for the entire packet to arrive. Payload data from incoming packets may then be transferred directly to host memory as soon as the relevant error detection code (such as checksum and/or CRC) has been validated, with only minimal data storage on the chip. "Memory-free" means that the network interface chip requires no dedicated external memory of its own, but rather may use the host memory to store connection context, payload data (when fragments of upper-layer protocol frames are received out of order), and other information. In this configuration, the chip must regularly read and write not only packet data, but also connection context information, over the host bus, thus increasing the challenge of operating at wire speed when the wire speed is more than half the bus speed.

The embodiments of the present invention that are disclosed hereinbelow provide network interface devices that answer these needs. In these embodiments, a network interface chip comprises a packet network interface, for coupling to a high-speed packet network, and a host bus interface, for coupling to one or more host processors and host memory. In addition to physical and MAC-layer interface functions, the network interface chip performs upper-layer protocol offload functions with wire-speed throughput. In contrast to devices known in the art, however, the speed of the chip's packet network interface (and the speed at which the chip performs upper-layer processing) is more than half the speed of the host bus. This high ratio of processing speed to bus speed, particularly in a cut-through, memory-free mode of operation, requires a number of design innovations, which are described in detail hereinbelow.

In some embodiments, the network interface device has two or more network ports, which share the same processing pipeline. Additionally or alternatively, the resources of the device may be shared by multiple hosts, as well as by multiple operating systems (i.e., a main operating system and one or more virtual operating systems) on a given host. The network interface device is configured so that each port appears to the host as though it was a separate device, with its own processing hardware, and so that each operating system on each host can interact with the device independently. This resource sharing is accomplished, in each case, while maintaining the wire-speed operation of the device.

FIG. 1 is a block diagram that schematically illustrates an exemplary network communication system 20, which may be utilized in accordance with an embodiment of the present invention. One or more host computers 22a, 22b, . . . , are connected to a packet network 24 by a network interface card (NIC) 26. In the description that follows, the network 24 is assumed to be a 10 Gbps Ethernet network, through which the computers may communicate with other computers and access other computing resources. Alternatively, aspects of the present invention may be applied in communications over packet networks of other types. For simplicity in the description that follows, a single one of the host computers 22a, 22b, . . . , is referred to simply as host computer 22.

Although the NIC 26 is referred to as a "card" and is shown in the figure as a separate unit from computers 22a, 22b, . . . , the key functions of the NIC are typically implemented in a single-chip device. This chip may be mounted on a separate card, or it may alternatively be mounted on the host motherboard, in LAN on motherboard (LOM) configurations, for example. Therefore, the term "NIC" as used in the description that follows should be understood to refer to a network interface device in general, regardless of whether or not it is mounted on its own dedicated card or on a circuit board together with other components.

The NIC 26 comprises one or more ports 28 for receiving incoming packets from and transmitting outgoing packets to the network 24. (Although two such ports are shown in the figures, in other embodiments the NIC may have a single port or may have more than two ports.) The NIC performs TCP/IP and upper-layer protocol (ULP) offload processing of the incoming and outgoing packets, as described in detail hereinbelow.

The NIC 26 also comprises a bus interface 30, which communicates with computers 22a, 22b, . . . , via a bus 32. In the present embodiment, bus 32 comprises a PCI Express packet bus, as is known in the art, which is configured to operate at 16 Gbps in the 8X configuration. The PCI Express bus is described in detail in PCI Express Base Specifications, Revision 1.1 (2005), published by the PCI-SIG organization (available at www.pcisig.com), and incorporated herein by reference. Alternatively, the bus interface may be configured to operate at different bus speeds and to communicate with buses of other types, including parallel buses (such as PCI-X), as well as packet buses. The NIC 26 uses the bus 32 to read and write data to and from the host memory 39 of the host computers, as well as for other host communications. Optionally, the NIC 26 may have an additional, dedicated high-speed memory 34 of its own, such as a double data rate (DDR) synchronous dynamic random access memory (SDRAM) chip, for storing communication context and other information. In the description that follows, however, it is assumed that NIC 26 is configured for memory-free operation, i.e., using the host memory 39 to store packet data and context, without the dedicated external memory 34.

Each host computer 22 comprises a central processing unit (CPU) 33 and memory 39, as well as others components known in the art (not shown). Typically, computers 22a, 22b, . . . , comprise servers, such as a cluster of blade servers, but the NIC 26 may operate with substantially any type of host computer, either alone or on a shared basis with other computers as shown in FIG. 1. Each computer 22 has a master operating system (OS) 35, which includes a physical driver (PDR) 37 for controlling interaction with the NIC. Optionally, the computer may also run one or more virtual operating systems 36, which have virtual NIC drivers 38. Methods for operating system virtualization are known in the art, and a number of companies, such as VMWare® (Palo Alto, Calif.) and XenSource (Palo Alto, Calif.), offer software that supports this sort of functionality.

The NIC 26 is configured to permit the resources of the NIC, including wire-speed protocol offload processing, to be shared among multiple host computers and/or master and virtual operating systems running on the same computer. Additionally or alternatively, when the NIC comprises multiple network ports 28 (as shown in the figure), the processing resources of the NIC may be shared among the ports, rather than providing a separate processing pipeline for each port. For example, when a NIC has multiple ports, an operating system may have multiple drivers, one for each port. Each driver, however, sees the NIC and its resources as though they were dedicated to that specific driver. Alternatively, an operating system may use a single driver to manage multiple ports. This configuration supports optimal use of the available resources, but requires that the NIC coordinate among the potentially-conflicting instructions that it receives from different drivers. The means by which the NIC permits resource sharing are described in detail hereinbelow.

Figure 2:
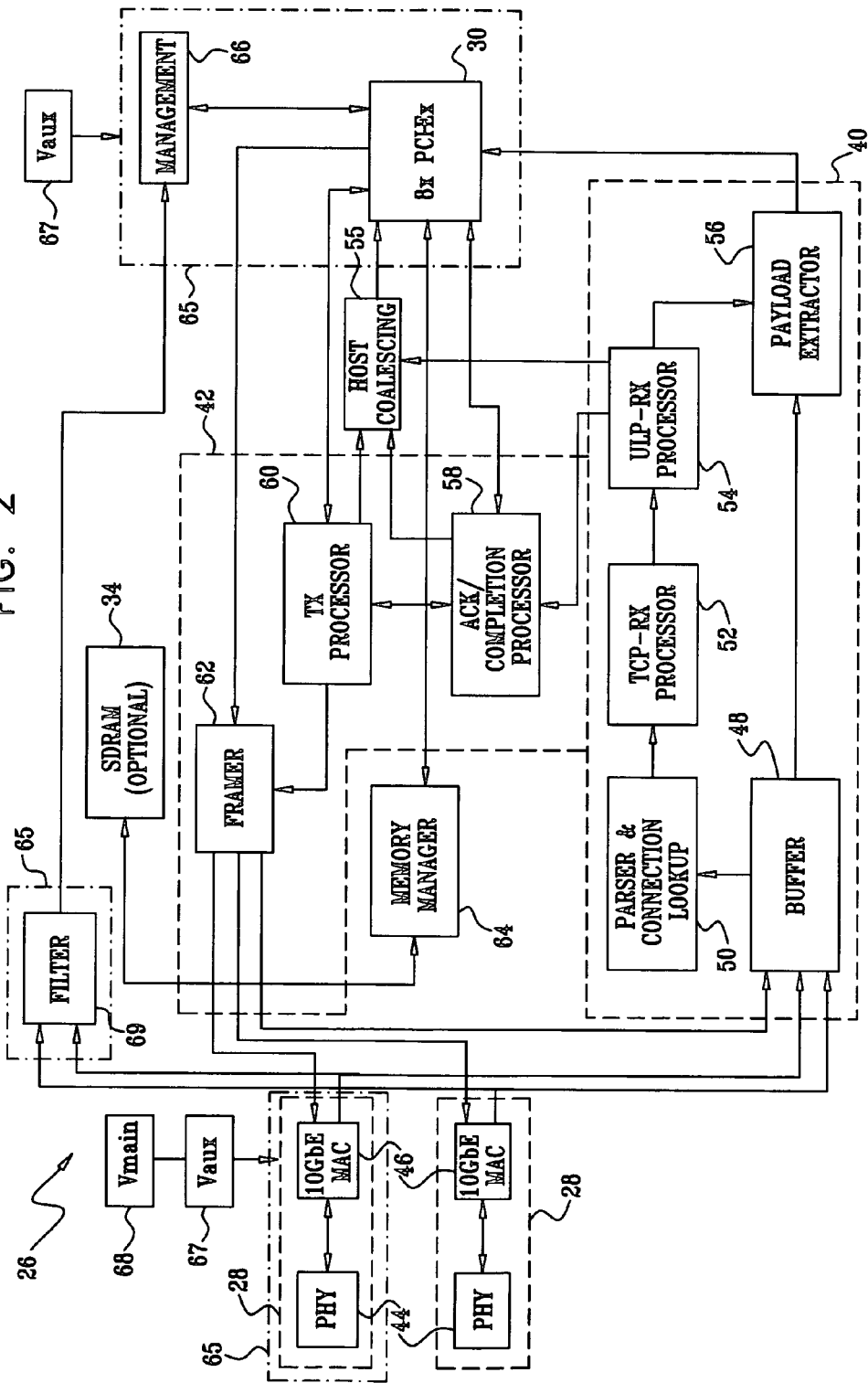
FIG. 2 is a block diagram that illustrates an exemplary network interface device, in accordance with an embodiment of the present invention.

FIG. 2 is a block diagram that illustrates an exemplary network interface device, in accordance with an embodiment of the present invention. Network ports 28 each comprise a 10 Gbps Ethernet (10 GbE) physical layer interface (PHY) 44 and MAC processor 46. these elements are considered to be beyond the scope of the present invention. MAC processors 46 communicate with protocol processing circuits in NIC 26, which comprise a receiver 40, which processes incoming packets, and a transmitter 42, which creates outgoing packets. The transmit and receive processors are described in detail hereinbelow, and will therefore be described only briefly in this section.

Incoming packets enter a receive buffer 48, which is shared among the network interfaces. The buffer is large enough to absorb bursts of incoming packets (as may occur, for example, when both ports 28 simultaneously receive 10 Gbps bursts). In an exemplary embodiment, the buffer holds up to 256 KB of data, although a larger or smaller buffer could be used. The buffer typically holds the packet data until TCP and upper-layer processing has been completed, and the corresponding Ethernet cyclic redundancy code (CRC) and TCP checksum have been verified.

A parser and connection lookup engine 50 typically begins analyzing the packet header information as soon as the header enters buffer 48, without waiting for the entire TCP frame to arrive. (As noted above, this is the meaning of "cut-through" processing.) Engine 50 parses the packet headers, including selected fields in one or more of the Ethernet, IP, TCP and UDP headers, in order to identify the connection identifier (CID) on which the packet was received and thus determine the packet protocols and type of processing required. For TCP packets, engine 50 prepares information required for TCP offload processing by a TCP receive processor 52. This processor assembles TCP frames, including alignment of packets received out of order from network 24. An upper-layer protocol (ULP) receive processor 54 handles header information and error detection for protocols in Layer 5 and above. Processor 54 is typically capable of dealing with, for example, the following: RDMA (iWARP), iSCSI and iSER, Network File System (NFS—a protocol suite for disk and file sharing, developed by Sun Microsystems), and Common Internet File System (CIFS—used for remote file access in Microsoft® operating systems). Additionally or alternatively, the ULP receive processor may support other upper-layer protocols. In addition, even when an incoming packet requires only Layer 2 or TCP (Layer 4) processing, the ULP receive processor handles placement of the packet data in host memory 39. The TCP and ULP receive processors are likewise configured for cut-through operation.

After the packet headers have been parsed, and error detection codes (such as CRC and checksums) have been verified, a payload extractor 56 removes markers and CRC from the payload, and sends the frame data to be written in the proper order to host memory 39, via bus interface 30. Prior to placement of the payload in host memory, the ULP Processor 54 may select the destination location, or locations. This may require examination of header fields within the payload, and protocol specific context information. Since determination of the destinations may require fetches of control data from host memory, the ULP Processor 54 may initiate fetches on a speculative basis based upon header fields before they have been validated by the TCP checksum and protocol specific CRC. The ULP processor 54 may notify host 22 that the frame data are now available in memory 39 by sending an interrupt via a host coalescing block 55, which similarly serves other elements of NIC 26, as shown in FIG. 2.

For processing an in-order frame, the ULP processor also notifies an acknowledgment (ACK) and completion processor 58 that the upper-layer frame was received in its entirety in good order (and that all the preceding frames on the connection have already arrived). Processor 58 notifies host 22 that the data is ready for processing by the appropriate host application and prepares a suitable acknowledgment message. Processor 58 passes the acknowledgment message to a transmit processor 60 for transmission over network 24 to the source of the frame. For processing and out-of-order frame, the ULP processor may provide the same notification. This may avoid a need for the ULP processor to distinguish between frames that are out-of-order and those that are in order. When the completion processor receives notification of an-out-of-order frame, it may store completion related information about a work request, for example, a total length received or a Steering Tag (STag) that a remote peer has requested to be invalidated, in a work request status array that may be parallel with or interleaved with a work request array.

When host computer 22 has data to be sent over network 24, it arranges the data in memory 39 and then notifies transmit processor 60 by sending an appropriate message via bus 32. The transmit processor generates the required header information (including Ethernet, IP, TCP and upper-layer protocol headers and error detection codes), and then instructs a framer 62 to construct the packet. The framer reads the appropriate data from host memory 39 via bus 32, as indicated by pointers provided by the transmit processor. The framer then frames the data in packets with the headers and error detection codes, and passes the packets to port 28 for transmission over network 24.

In performing the functions described above, receiver 40 and transmitter 42 access and update context information regarding the communication connections that they are serving. High-speed, low-latency access to the context information is one of the keys to the ability of the receiver and transmitter to process packets at wire speed. Complete context information is held in host memory 39 (or, optionally, stored in dedicated high-speed RAM 34), while context for connections that are currently being served is cached on chip in the NIC 26. A memory management unit (MMU) 64 coordinates memory caching, retrieval and writeback among the various processing blocks. The caching schemes used by NIC 26 are described in detail hereinbelow. In one embodiment of the invention, firmware may implement any of a plurality of known algorithms such as each STAG may point to a set of page tables similar or identical to the page table used by memory management unites (MMUs), for example.

The NIC 26 comprises a dedicated management processor 66, for control and diagnostic purposes. A dedicated filter 69 processes incoming packet traffic at wire speed in order to identify in-band management packets and pass these packets to the management processor. Typically, the management processor has other communication ports, such as a serial bus (SMBus) and/or a separate LAN interface (not shown), for communications with a Baseboard Management Controller (BMC). The filter 69 is typically capable of handling incoming traffic at the maximal packet rate supported by network 24. In the present example, the maximum packet rate is about 15 million packets/sec, assuming 64-byte packets coming in on a single port at 10 Gbps, or 30 million packets/sec on both ports 28. As a result of the dedicated high-speed filtering provided by filter 69, management processor 66 will still be able to receive and respond to in-band management traffic even under conditions of a denial of service (DoS) attack on system 20, when receiver 40 may be stalled by the traffic load. In addition, ports 28 are configured to give outgoing management packets priority over outgoing user packets.

The NIC 26 receives operating power from an auxiliary power supply (Vaux) 67 and from a main power supply (Vmain) 68. The main power supply provides power to all components of the NIC in normal operation. When the host is not in use, however, the NIC enters a low-power mode in order to reduce power consumption and heat dissipation. Under these conditions, Vmain shuts off, thus powering down transmitter 42 and receiver 40. Vaux supplies limited current only to certain "islands" 65 that are needed to enable host 22 to be remotely "woken up" when necessary. In the example shown in FIG. 2, these islands include at least one of network ports 28, filter 69 management processor 66, and bus interface 30. In low-power mode, port 28 operates at a reduced bit rate, such as 1 Gbps. Optionally, both of ports 28 may be included in islands 65.

While NIC 26 is in low-power mode, management processor 66 continues to run management protocols and search for wakeup frames coming in from network 24 and wakeup instructions from bus 32. Upon receiving a wakeup frame, the management processor asserts a wakeup signal to the power supply. The power supply activates Vmain, which boots the host. The host BIOS resets the PCI bus, which indicates to the management processor that the host has exited low power mode. The management processor then configures ports 28 for full-speed operation, and switches on receiver 40 and transmitter 42. A remote management system (not shown) may send wakeup frames in order to wake up NIC 26 and an associated host computer 22 even when host CPU 33 is not running. The remote management system may use this method to boot computer 22 when it is shut off.

Memory-Free Packet Receiver with Ultra-Cut-Through Operation

Figure 3:
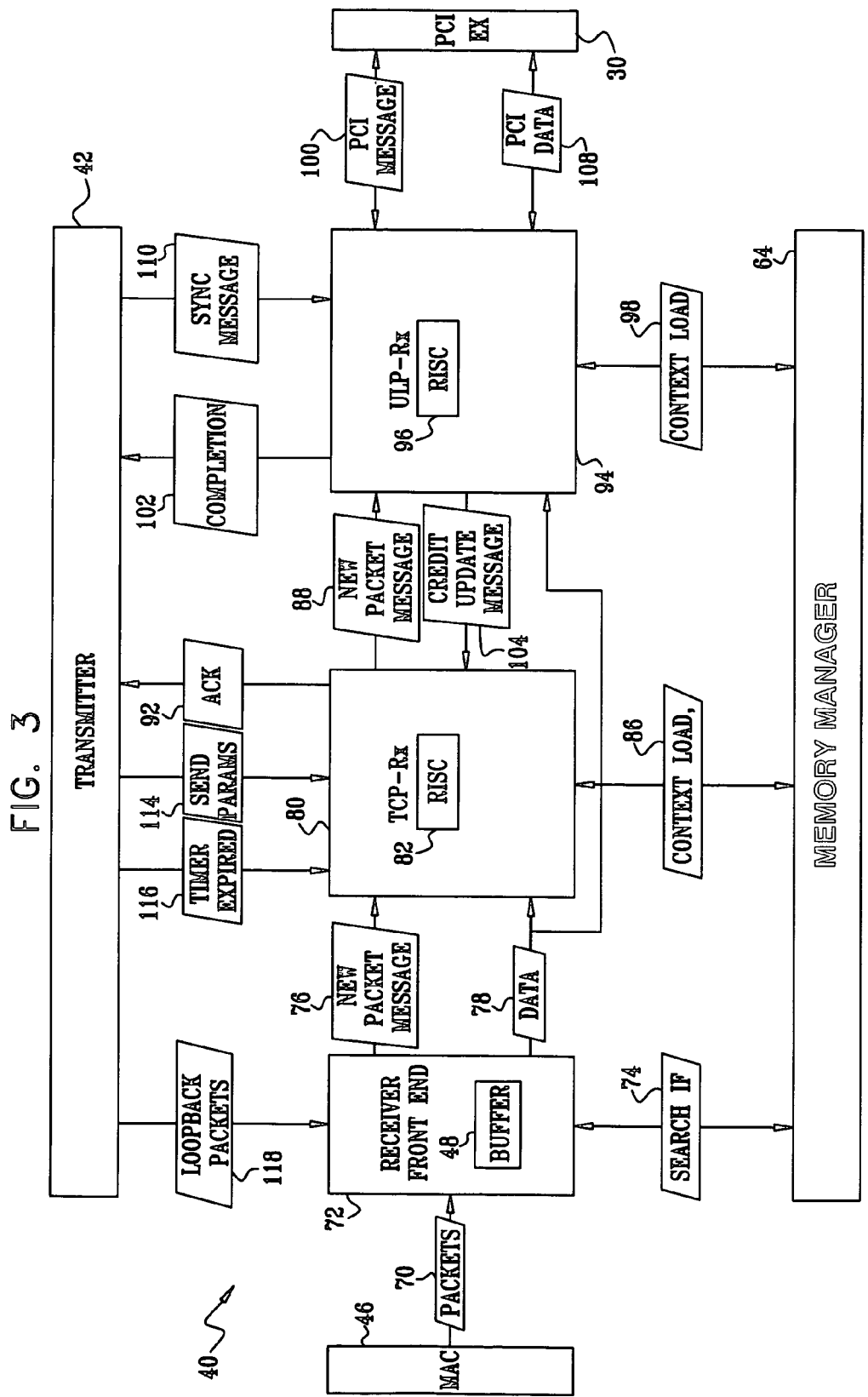
FIG. 3 is a block diagram that illustrates an exemplary packet receiver, in accordance with an embodiment of the present invention.

FIG. 3 is a block diagram that illustrates an exemplary packet receiver 40, in accordance with an embodiment of the present invention. In this figure and in subsequent figures, functional blocks are represented by rectangles, while parallelograms represent messages sent to and from the blocks. MAC processor 46 passes incoming packets 70 to a receiver front end (RFE) 72, which comprises buffer 48 and processing circuits that are described further hereinbelow with reference to FIG. 4. RFE 72 parses the incoming packets to extract the header information. A portion of the IP and TCP header, known as the 4-tuple (IP source address, IP destination address, TCP source port, TCP destination port), is used to identify the connection on which the packet arrived. The RFE communicates with memory manager 64 via a search interface 74 in order to get the connection ID (CID) for that connection, to determine whether the context for that connection is in cache on the NIC chip, and if it is not in the cache, to retrieve the required context from host memory 39 to the cache.

For non-offloaded connections (i.e., connections for which a host processor performs the protocol processing), it is desirable that processing of received traffic be distributed among multiple host processors in order to achieve high throughput. (Such distribution is known in the Windows environment as Receive Side Scaling (RSS).) In order to increase host processor cache efficiency, as well as to avoid inter-processor locks, all traffic for a specific connection should be processed by the same host processor. For this purpose, the RFE requests that a searcher 145 (FIG. 4) calculate a hash on the 4-tuple (for TCP traffic) or on a 2-tuple (source IP address, destination IP address for non-TCP traffic or for fragmented IP packets). The hash result is then used by a TCP receive (TCP-Rx) processor 80 to determine which host processor should process that packet.

Upon identifying a new TCP/IP packet, RFE 72 sends a new packet message 76 to TCP-Rx processor 80, instructing the TCP-Rx processor to begin processing the TCP and IP header information in the packet. Processor 80 reads and begins to process the appropriate header fields of packet data 78 from buffer 48, typically while the payload portion of the data continues to flow into the buffer from the MAC processor. The payload data remain in buffer 48 and do not pass through TCP-Rx processor 80 at all.

TCP-Rx processor 80 comprises a dedicated reduced instruction set computer (RISC) engine 82. An exemplary RISC engine, which is optimized for the sort of packet processing performed by NIC 26, is described in the above-mentioned U.S. patent application entitled, "High-Speed Multi-threaded Reduced Instruction Set Computer (RISC) Processor." RISC engine 82 operates together with associated data moving and management circuits, which are shown in detail in FIG. 5. Like RFE 72, TCP-Rx processor 80 uses cached context for active connections, based on an efficient caching scheme that is described hereinbelow. When the required context information is not in the cache, a context load operation 86 is initiated by a context manager 170 (FIG. 5) via memory manager 64. The context manager waits for the context to be loaded and then instructs the RISC engine to start processing of the packet. Meanwhile, processor 80 may continue to process other packets for which context information is present.

The TCP requires that an acknowledgment (ACK) be returned over the network to the source address of a TCP frame after the frame has been validated. For this purpose, TCP-Rx processor sends an ACK message 92 to transmitter 42 after the entire frame has been received, and the checksum has been validated. NIC 26 may be configured to generate ACK messages in accordance with various different exemplary policies, such as, for example: (1) Send ACK after the checksum has been validated, as described above, and after identifying a buffer in host memory 39 in which the data will be placed (i.e., if there is no buffer available for the data, behave as though the packet was not received); (2) Send ACK after the conditions in (1) above are met, and in addition, ULP processing finishes (i.e., when a DMA request to copy the packet data from buffer 48 to host memory 39 has been posted to bus interface 30); and (3) Send ACK after the conditions in (2) above are met, and in addition, confirming that the data have been placed in host memory 39. To guarantee that the data have been successfully written to the memory, the ULP-Rx processor posts a zero-length read request to read from the placement address in host memory after it has first posted the DMA write request to copy the data from buffer 48 to the host memory to bus interface 30. PCI bus specifications mandate that a read request cannot bypass a write. Therefore, when the zero-length read response completes, the ULP-Rx processor can be certain that the data have already been placed in host memory and not just posted to the host memory controller. Thus, if the host crashes before the read operation completes, the NIC behaves as though the packet was not received. It may be seen that these policies offer different trade-offs between speed of acknowledgment and data security, which may be appropriate for different types of applications.

The transmitter then returns the appropriate ACK packet to the source address. (If the frame was corrupted or data received out of order from the network, the transmitter may be instructed to return duplicate ACKs, so as to cause the packet source to retransmit the data.) The checksum can be computed only after the entire frame has reached buffer 48. To reduce latency, however, the TCP-RX processor sends a new packet message 88 to an upper-layer protocol receive (ULP-Rx) processor 94 as soon as the TCP header processing is completed. ULP processing may then begin immediately. In the event that the TCP frame is found to be invalid, the ULP processing results are discarded.

Figure 6:
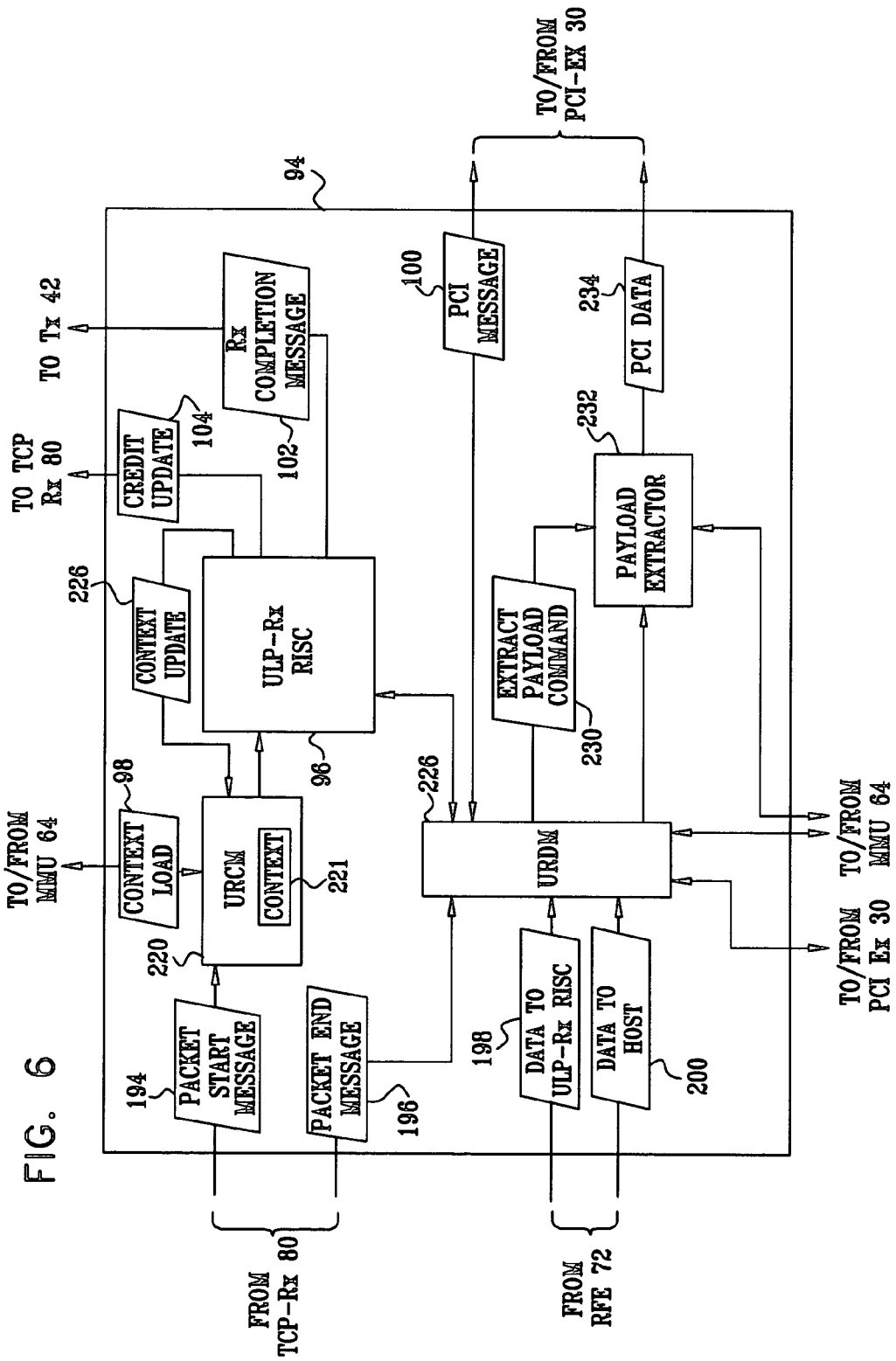
FIG. 6 is a block diagram that illustrates an exemplary upper-layer protocol receive processor, in accordance with an embodiment of the present invention.

The ULP-Rx processor 94 comprises its own dedicated RISC engine 96, along with data moving and management circuits, as shown in detail in FIG. 6. Upon receiving new packet message 88, processor 94 reads the required ULP header data from buffer 48 and, if necessary, invokes a context load operation 98 via memory manager 64 (using a context manager 221, shown in FIG. 6). In typical operation, ULP-Rx processor 94 processes multiple different flows simultaneously, and these flows may use different upper-layer protocols, with different levels of demand on the resources of the ULP-Rx processor. (For example, some incoming packets may carry RDMA or iSCSI protocol data units [PDUs], which require header processing by the ULP-Rx processor, while others require only lower-layer processing by RFE 72 and possible TCP offload processing by TCP-Rx processor 80.) A given flow may be delayed in the pipeline of ULP-Rx processor 94 due to high resource demand or while waiting for certain data structures needed for Layer 5 processing, such as the RDMA steering tag (STAG) and physical buffer list (PBL), to be loaded from host memory. In such cases, the other resources of receiver 40 are best diverted to deal with other flows. The ULP-Rx processor controls the use of these resources by sending credit update messages 104, which inform the TCP-Rx processor of the ability of processing resources and buffers to handle each given flow. The TCP-Rx processor allocates its resources to the flows that have a positive credit balance.

The ULP-Rx processor 94 (as well as other elements of receiver 40, transmitter 42 and memory manager 64) communicates with host 22 by sending and receiving PCI messages 100 and PCI data 108 via bus interface 30. When processor 94 determines that a given PDU has been successfully validated, i.e., the header data have been processed and packet validity checks have passed, it transfers the packet payload data from buffer 48 to the appropriate location in host memory 39. In the case of RDMA, there may still be header errors, which by protocol rules, may be detected once the packet is processed in order. In this regard, the processing may be done in the completion processor rather than in the ULP-RX processor. The ULP-Rx processor may also send a completion message 102 to acknowledgment/completion processor 58 to report that at least some of the PDUs were successfully received and processed.

In addition to the messages sent from the elements of receiver 40 to transmitter 42, the transmitter also conveys various messages to the receiver. Some of these messages are described in greater detail hereinbelow. Briefly, the exemplary messages may comprise: Synchronization messages 110 from transmitter 42 to ULP-Rx processor 94 with respect to objects that can be shared between transmitter and receiver (for example, relating to STAG invalidation for RDMA); and similarly, the transmitter passes send parameters 114 to TCP-Rx processor 80 with respect to TCP connections that are established and outgoing TCP/IP packets that are transmitted. The transmitter 42 maintains timers to keep track of the times of packet transmission and sends a timer expired message 116 to the TCP-Rx processor when the timer runs out. This message alerts receiver 40 to the need to request retransmission of a given packet or packets. The transmitter 42 may send loopback packets 118 to RFE 72 (rather than transmitting these packets to network 24). Loopback packets may be used for testing purposes, as well as for communication between different hosts 22a, 22b, . . . , and between different processes running on a given host. Loopback packets are also used when migrating a TCP connection from the stack of the host operating system to the offload stack on NIC 26. In this case, all the packets pending processing on the OS stack are sent to the NIC via the loopback port. Additionally, loopback may be utilized for IP fragmentation and for non-aligned UL PDUs. The loopback interface may also be used to allow host software to collect non-aligned PDUs and resubmit them as aligned PDUs.

Receiver Front End

Figure 4:
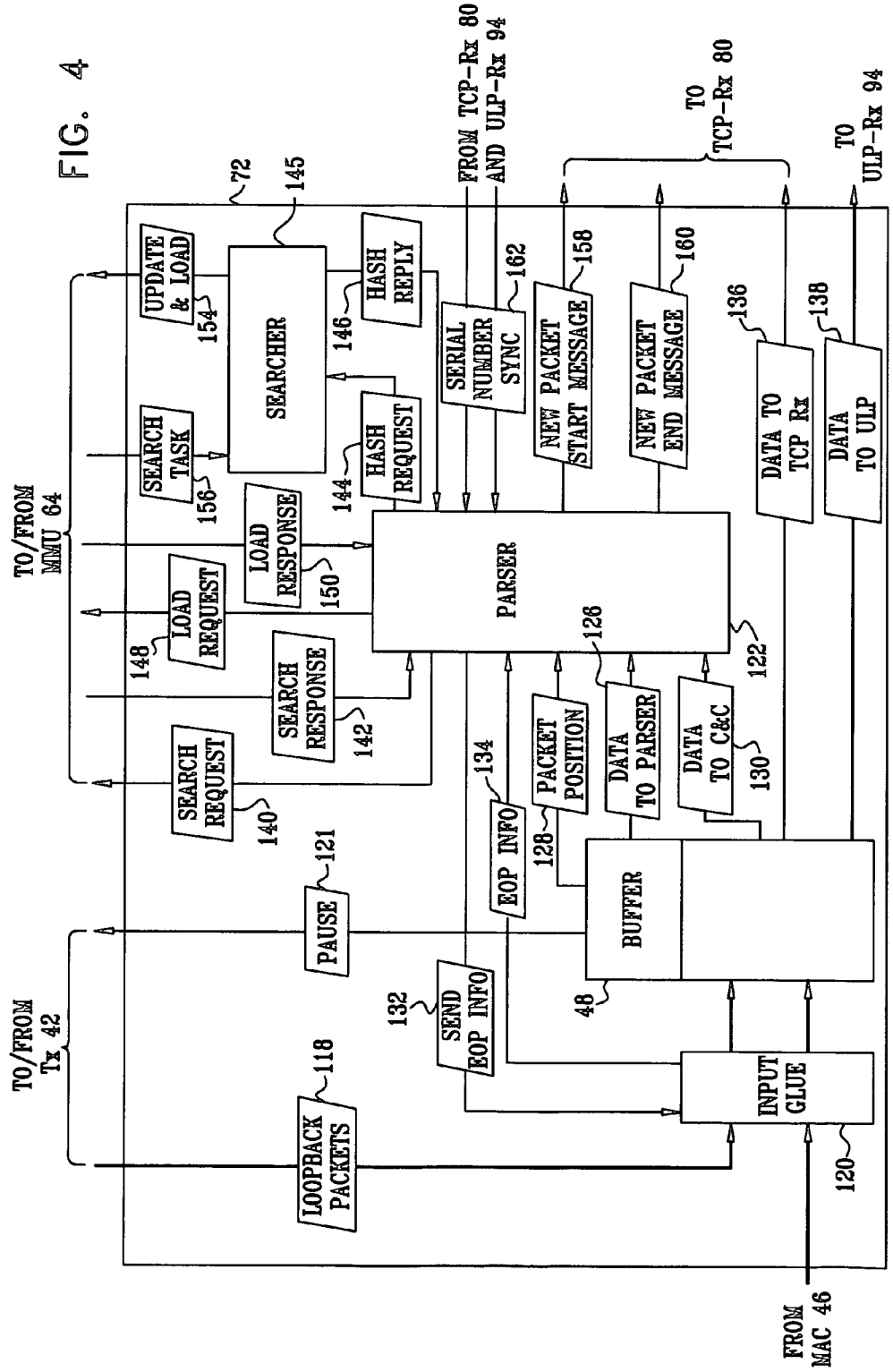
FIG. 4 is a block diagram that illustrates an exemplary receiver front end, in accordance with an embodiment of the present invention.

FIG. 4 is a block diagram that illustrates an exemplary receiver front end 72, in accordance with an embodiment of the present invention. Input glue logic 120 passes packets from MAC processor 46 and transmitter 42 to buffer 48. The glue logic counts the packet length and maintains output queues with end-of-packet (EOP) descriptors, which contain the packet length. Buffer 48 is typically implemented as a single port RAM with a wide, high-bandwidth interface. The buffer controller maintains lists of all the blocks of data that are stored in the buffer. Every incoming packet is written to the RAM, starting at the beginning of a new block, and may be extended to more blocks according to its length. All the blocks that contain a single packet are linked. The buffer controller may issue a pause request 121 when it is necessary to stop the data inflow to the RFE 72.

For every incoming packet, after a predetermined number of bytes have been received, buffer 48 sends a packet position message 128 to a parser 122. Parser 122 then reads and processes packet header data 126 from buffer 48. The parser typically parses the Ethernet, IP (IPv4 or IPv6) and transport-layer (TCP or UDP) headers. To process the header of each packet, parser 122 sends read requests to buffer 48 to read the relevant data. The initial read is based on the start block indicated by packet position message 128. Subsequent reads may be dependent on parsing done on previous data. Parsing of the header includes functions such as parsing VLAN tags (which may be nested), validation of version and length fields, and validation of the IP header checksum. After completing the header processing, the parser sends an EOP information request 132 to glue logic 120, which responds (after the entire packet has entered by buffer) by returning the appropriate EOP descriptor information 134 for the packet.

After the parsing the packet header, parser 122 sends a search request 140 to MMU 64 to find the context for the packet. The MMU 64 is described in detail with reference to FIG. 10 below. To summarize briefly, the MMU caches the context of active connections, so as to minimize the need to access context data in host memory 39. When parser 122 submits search request 140, the MMU first checks whether the connection in question is cached in NIC 26. If not, the MMU submits a search task 156 to searcher 145, asking the searcher to find the connection ID of the received packet. The searcher then returns a connection update 154 to the MMU. Search response 142 informs the parser that the required context is not currently in cache. The parser submits a load request 148, asking the MMU to load the context for this connection into cache. The MMU then returns a load response 150.

The search request 140 uses the above-mentioned 4-tuple as a search string to look for the connection ID (CID). The MMU first looks for the 4-tuple in a content-addressable memory (CAM) 354 (FIG. 10), which contains the 4-tuples for all cached connections. If the connection is not cached, the MMU consults searcher 145 for the CID. The searcher uses a Toeplitz hash, for example, to look for the connection in a hash table located in host memory. When the CID is found, the MMU loads the context for that connection into the context cache.

In addition, for distribution of non-offloaded traffic among multiple host processors (RSS, as described above), the parser asks the searcher to calculate a hash over the 4-tuple or 2-tuple in a hash request 144. The searcher returns the result to the parser in a hash reply 146. In this case, the parser sends the hash result to the TCP-Rx processor, which determines, based on the hash result, which host processor should process that packet. It should be recognized that the host processor may not be selected solely upon the a hash of the header without any other context. Accordingly, in instances where multiple virtual devices are supported, for example, when supporting multiple guest kernels, then the set of host processors may be restricted to those on which the specific guest associated with the virtual Ethernet device is enabled to run.

The MMU 64 returns the context parameters to parser 122 in a search response 142. If the connection is cached, the MMU immediately returns the local CID (LCID), which is the number of the cache entry in the context cache, after finding a match for the 4-tuple in CAM. If the connection is not cached, the MMU asks the searcher to look for the CID and then loads the context into cache. After the context has been loaded, the MMU returns the LCID to the parser. After receiving the response from MMU 64 and/or searcher 145, parser 122 sends a new packet start message 158 to TCP-Rx processor 80. Message 158 includes TCP and other packet parameters, context parameters received from the MMU, and the hash result provided by the searcher.

In addition to the header and context-related functions described above, parser 122 also performs CRC and checksum (C&C) computations, based on full packet data 130 read from buffer 48. For every TCP or UDP packet, the parser calculates the TCP or UDP checksum. While reading and calculating the checksum, the parser simultaneously calculates the CRC of the packet payload, assuming the payload to comprise an aligned framed UL PDU. Pre-calculation of the CRC reduces latency in subsequent processing by ULP-Rx processor 94. (If the payload is not an aligned RDMA PDU, the CRC value may simply be discarded.) The C&C machine is able to work on multiple interleaved packets arriving on different ports by requesting and receiving the appropriate packet data 130 from buffer 48. When the C&C calculations are finished, and EOP information 134 has been received from input glue 120, parser 122 generates a new packet end message 160 to TCP-Rx processor 80.

The parser 122 uses circular queues to hold the TCP checksum and RDMA CRC results. In order to avoid prematurely overwriting the entries in these queues, the TCP-Rx and ULP-Rx processors send serial number sync messages 162 to the parser to indicate processing of these results.

As noted above with reference to FIG. 3, buffer 48 outputs packet data 78 as required directly to TCP-Rx processor 80 and to ULP-Rx processor 94. This data flow is shown specifically in FIG. 4 to comprise output data 136 to TCP-Rx processor 80 and output data 138 to ULP-Rx processor 94.

TCP Receiver Processor

Figure 5:
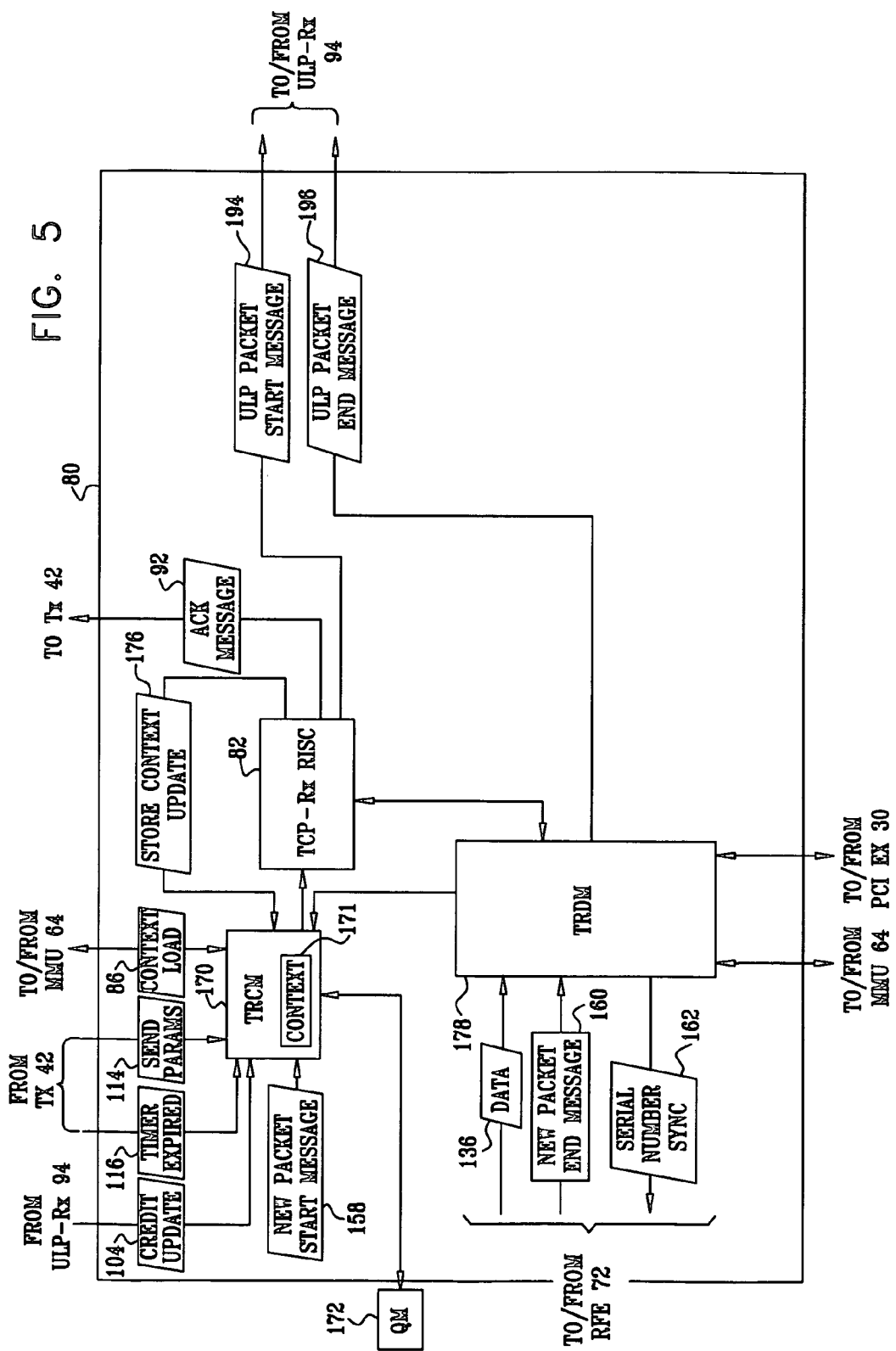
FIG. 5 is a block diagram that illustrates an exemplary TCP receive (TCP-Rx) processor, in accordance with an embodiment of the present invention.

FIG. 5 is a block diagram that illustrates an exemplary TCP receive (TCP-Rx) processor 80, in accordance with an embodiment of the present invention. A TCP-Rx context manager (TRCM) 170 receives and arbitrates among new packet start messages 158 from parser 122 in order to choose the next message for processing. The actual TCP packet processing is carried out by RISC engine 82. TRCM 170 holds and updates context information for the relevant connections in a cache 171, and it transfers the context information to and from RISC engine 82 as required. The TRCM registers messages awaiting processing in a queue held by a queue manager 172, which also serves the other processing blocks in NIC 26. Since the queue is handled jointly by the context manager and the queue manager, these elements may be considered to be, in the context of the present patent application and in the claims, an example of "queuing circuitry."

The TRCM 170 may receive messages from a number of exemplary sources: as noted above, parser 122 sends new packet message 158 for every incoming packet. This message is forwarded to RISC processor 82; ULP-Rx processor 94 sends credit update message 104 to indicate resource availability or shortage. Credit update messages are aggregated in the connection context and registered with QM 172; the transmitter 42 sends timer expired message 116 whenever a timer expires. These messages are also aggregated in the context and registered with QM 172; RISC engine 82 itself sends context update messages 176 to write back context data to cache 171; and the QM 172 sends the next connection in the queue. The TRCM performs arbitration based on these sources of information and chooses the next message to pass to RISC engine 82. The TRCM 170 submits the required context with each input message to the RISC processor.

The TRCM 170 may keep a global usage counter indicating the number of currently queued connection. For each queue registration command sent to QM 172, the counter is incremented, and for each input request from the QM 172, the counter is decremented. If the TRCM 170 thus determines that the QM has no more messages waiting in its queue, the TRCM 170 may pass incoming messages directly to RISC engine 82, without the added burden of queue registration. This feature reduces processing latency when the processing load is low. Further aspects of context and cache management functions performed by TRCM 170 for purposes of efficient caching are described hereinbelow. Similar functions may be performed by the other context managers in NIC 26.

The RISC engine 82 performs the functions of TCP frame processing and deciding when acknowledgments should be transmitted. In addition, the TCP-Rx RISC engine identifies the start of each new upper-layer protocol data unit (ULPDU), and notifies ULP-RX processor 94 by sending a ULP packet start message 194. A TCP-Rx data mover (TRDM) 178 controls data movement between TCP-Rx processor 80 and other elements of NIC 26. TRDM 178 loads packet header data 136 from buffer 48 into internal memory of RISC engine 82 for TCP processing. After receiving new packet end message 160 from parser 122, TRDM 178 generates and sends a corresponding ULP packet end message 196 to ULP-Rx processor 94. The TRDM also generates serial number sync messages 162 to the parser.

ULP Receive Processor

FIG. 6 is a block diagram that illustrates an exemplary upper-layer protocol receive (ULP-Rx) processor 94, in accordance with an embodiment of the present invention. Processor 94 comprises a ULP-Rx context manager (URCM) 220 which communicates with QM 172 (FIG. 5) in a manner similar to the interaction of TCP-Rx processor 80 with the context and queue managers. URCM 220 likewise comprises a context cache 221 and receives context updates 226 from ULP-Rx RISC engine 96. A ULP-Rx data mover (URDM) 226 loads ULP header data 198 from buffer 48 into internal memory of RISC engine 96, and performs other functions analogous to those of TRDM 178. RISC engine 96 controls data flow in earlier stages of receiver 40 by sending credit updates 104, as described above.

The RISC engine 96 may be programmed in microcode to process various upper-layer protocols, at Layer 5 and above in the Open Systems Interface (OSI) scheme. As noted earlier, in some embodiments these protocols include RDMA (iWARP), iSCSI (including iSER), NFS and CIFS. When incoming packets require only Layer 2 or TCP (Layer 4) processing, RISC engine 96 handles placement of the packet data in host memory: into application buffers when available, or into global receive queues in other cases.

Upon receiving ULP packet end message 196 from TRDM 178, URDM 226 informs RISC engine 96 that the current packet has been completed. The packet end message also indicates whether the checksum and CRC results (if applicable) were valid. RISC engine 96 then instructs URDM 226 to write the packet data to host memory 39 and sends completion message 102 to transmitter 42. In response to the instruction from the RISC engine, URDM 226 issues a packet build command 230 to a payload extractor 232. The URDM then reads packet payload data 200 directly from buffer 48 to the payload extractor, which outputs PCI data packets 234 to be written via bus interface 30 to the host memory.

In iSCSI packets, the PDU includes a data integrity field (DIF) following the payload data. This DIF has the form of a CRC and may contain additional data, as specified in standards promulgated by the T10 Technical Committee of the International Committee on Information Technology Standards (INCITS). NIC 26 may also compute and validate the DIF/CRC values, so that host CPU 33 is thus relieved of the task of DIF computation and validation. The DIF computation may be performed on the data path, or alternatively it may be performed off-line on data blocks in host memory, as described hereinbelow with reference to FIGS. 18B, 19A and 19B. DIF calculation may also be offloaded to NIC 26 for outgoing packets in storage operations initiated by host 22, as described hereinbelow with reference to FIG. 18A.

Figure 7:
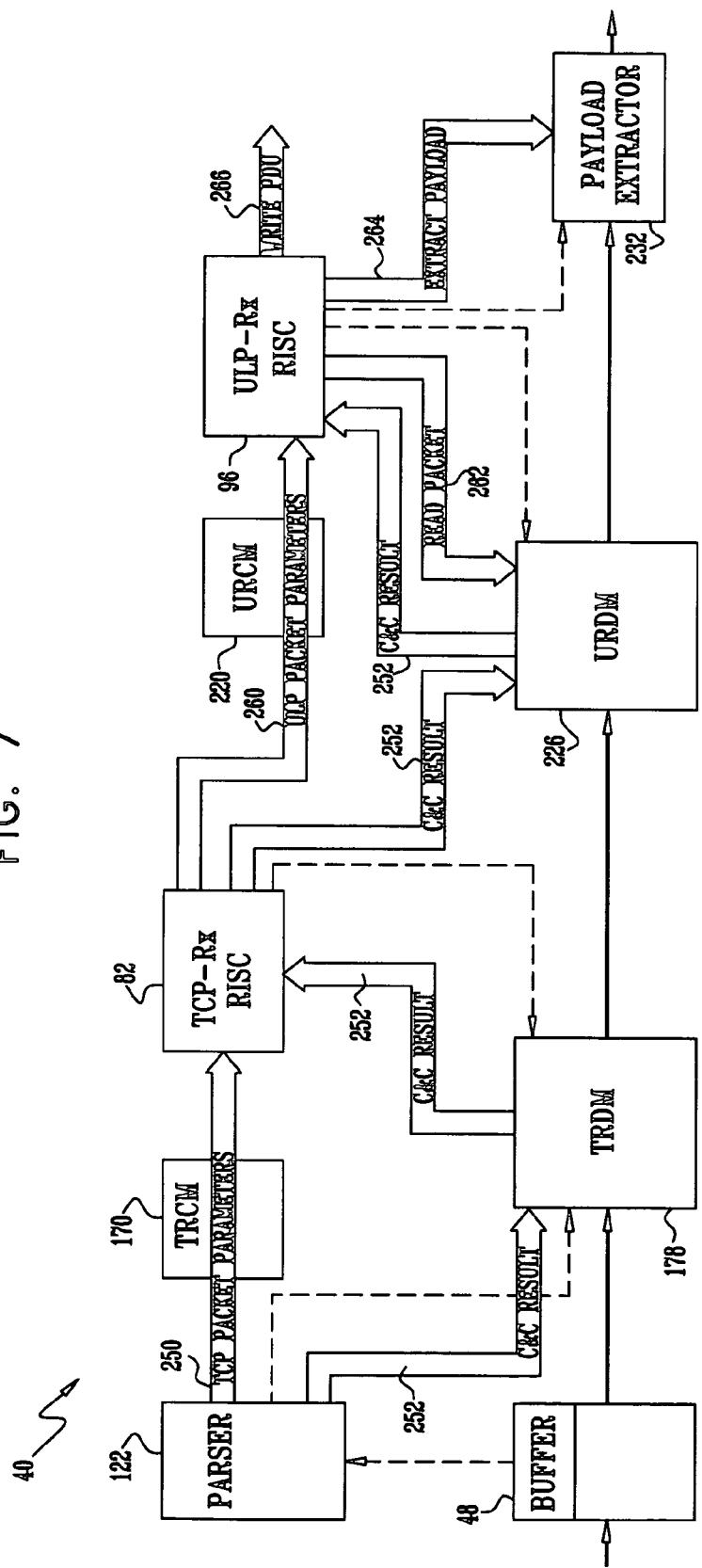
FIG. 7 is an exemplary block diagram that illustrates the cut-through processing chain in the packet receiver of FIG. 3, in accordance with an embodiment of the present invention.

FIG. 7 is an exemplary block diagram that illustrates the cut-through processing chain in the packet receiver 40 of FIG. 3, in accordance with an embodiment of the present invention. The example shown in FIG. 7 refers to processing of RDMA packets, but the principles embodied in this example may likewise be applied to other upper-layer protocols. The functional blocks and operations illustrated in FIG. 7 were already shown and described above with reference to the preceding figures, but they will be summarized here in order to bring out more clearly the features of cut-through processing that are implemented in receiver 40.

The parser 122 passes TCP packet parameters 250 to TRCM 170 as soon as the packet header has entered buffer 48 and header parsing is completed, without waiting for the rest of the packet to arrive. The TRCM passes the packet parameters to TCP-Rx RISC engine 82, which processes the packet header data and identifies ULP packet parameters 260. ULP-Rx RISC engine 96 receives the ULP packet parameters via URCM 220 and performs the applicable upper-layer processing. All these steps, which depend only on the packet header, may take place immediately (depending on the status of the relevant queues), while the remainder of the packet continues to flow into buffer 48 from network 24. Thus, all header processing, including Ethernet, IP, TCP, and RDMA headers, may be completed even before the tail of the packet has been received.

Once the entire packet has arrived in buffer 48, parser 22 computes a checksum and CRC (C&C) result 252, as described above. The C&C result is passed forward by TRDM 178 and URDM 226 to ULP-Rx RISC engine 96. Upon determining that the C&C result is valid, RISC engine 96 issues a read packet instruction to URDM 226 and an extract payload instruction 264 to payload extractor 232. The URDM then reads the packet data directly from buffer 48, and the payload extractor removes markers and CRC from the payload and then selects and validates the host destination. The ACK may then be enabled and the data written to the host memory. When required (such as when a Layer 2 packet is received, a TOE placement buffer is filled, or an RDMA send message is a last segment that is received in order), RISC engine 96 issues a write PDU completion message 266 to the host.

This scheme minimizes the amount of time that RDMA packets must remain in buffer 48, and thus minimizes the processing latency and the buffer size requirements.

Memory-Free Cut-Through Transmitter

Figure 8:
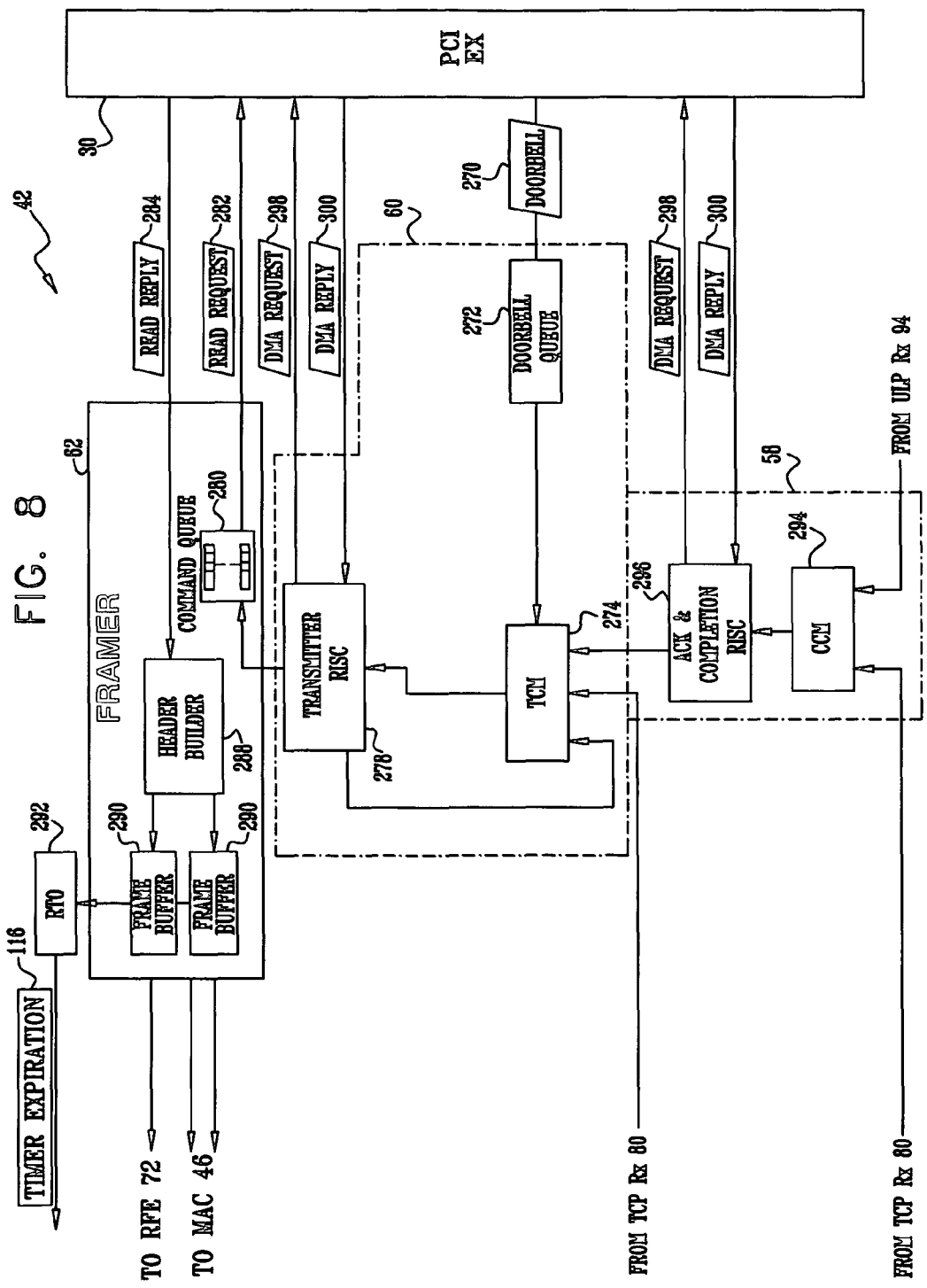
FIG. 8 is an exemplary block diagram of the transmitter of FIG. 2, in accordance with an embodiment of the present invention.

FIG. 8 is an exemplary block diagram of the transmitter 42 of FIG. 2, in accordance with an embodiment of the present invention. The transmitter comprises ACK/completion processor 58, transmit processor 60, and framer 62, as shown above in FIG. 2. Like the TCP-Rx and ULP-Rx processors described above, transmit processor 60 comprises a transmitter RISC engine 278, with a transmit context manager (TCM) 274, while ACK/completion processor 58 comprises an ACK/completion RISC engine 296 with a completion context manager (CCM) 294. Both the transmit processor and ACK/completion processor interact with QM 172 (FIG. 5) in the manner described above. Each of the RISC engines also has a corresponding data mover (similar to TRDM 178, shown in FIG. 5), but the data movers are omitted from FIG. 8 for the sake of simplicity. The interrelations between these RISC engines and the corresponding context and queue managers and data movers are similar to those described above with respect to the receiver blocks.

To initiate transmission of RDMA packets, for example, the application on host computer 22 requesting the transmission submits a work request, which defines the data transfer that is to take place. Based on this work request, driver software on host 22 generates a work queue element (WQE) in memory 39 and writes a doorbell message 270 via bus 32 to a doorbell queue 272 in transmit processor 60. Details of the doorbell queue are shown below in FIG. 9. TCM 274 receives the request from the doorbell queue and passes it to Tx RISC engine 278 (after queuing by QM 172 if needed). The TCM requests the context from MMU 64 (omitted from this figure for simplicity). MMU 64 checks whether the required context information is present in its cache and if not, loads it into the cache.

Upon receiving the request from TCM 274, RISC engine 278 sends a direct memory access (DMA) request 298 via bus interface 30 to read the WQE indicated by the doorbell message. The bus interface returns a DMA reply 300 giving the WQE and other information needed to process the WQE, such as the RDMA steering tag (STAG) and physical buffer list (PBL). Typically, TCM 274 aggregates multiple doorbell rings on the same connection and monitors the TCP transmit window of the connection in order to decide when to process the rings. Thus, the TCM may invoke the RISC engine only once in order to process multiple work requests that have been posted on a given connection as long as the RISC engine has not yet started processing the first WQE, and the TCP transmit window allows for transmission. RISC engine 278 processes the WQEs using context information provided by TCM 274, in order to generate packet header parameters and one or more pointers to the locations in memory 39 of the RDMA data that are to be transmitted. The RISC engine then places a transmit request (including the header parameters and pointers) in a transmit command queue 280 of framer 62. There is a separate queue for each of ports 28, as well as a queue for loopback packets.

When the transmit request reaches the head of the queue, framer 62 submits a read request 282 via bus interface 30 to read the appropriate data from memory 39, as indicated by the transmit request pointers. In addition, the framer writes the information in the transmit request to a history queue in host memory 39 for use in case retransmission is required (as described further hereinbelow). Bus interface 30 returns a read reply 284 containing the requested data, to which framer 62 adds the appropriate headers, in accordance with the parameters provided by transmitter RISC engine 278. A single work request may generate more than a single packet (because the volume of data to be transmitted, for example, may be larger than a single packet can carry). Framer 62 segments the payload into packets, and advances the IP ID and TCP sequence number of the packets beyond the initial values provided to it by Tx processor 60. A header builder 288 computes the required checksum and CRC values (optionally including the DIF value in the case of SCSI blocks), and the framer appends these values to the outgoing packets in the appropriate locations.

The framer 62 places the complete packets in frame buffers 290, which feed MAC processors 46 (or RFE 72, in the case of loopback packets). The framer informs TCP-Rx processor 80 of transmission of a TCP packet by sending context parameter update 114 to TRCM 170. Upon transmission of the packet, a retransmission timeout (RTO) timer 292 is set, and is then reset each time another TCP packet is sent on the same connection. Timer 292 sends timer expiration message 116 to TCP-Rx processor 80 when the time expires. As noted earlier, this timer causes processor 80 to generate a retransmit instruction if an ACK is not received from the packet destination before timeout occurs.

When it is necessary to retransmit a packet (either after transmission timeout or in response to a retransmission request—which may be in the form of duplicate ACKs with the same TCP sequence number—by the recipient), TCM 274 consults a history queue in host memory 39 for the information that is needed to generate the packet or packets for retransmission. The history queue is a circular queue, which is indexed according to the sending order of the outgoing packets. When TCP-Rx processor 80 instructs TCM 274 that a certain packet must be retransmitted, the TCM looks up the packet information (header parameters and data pointers) for this packet in the history queue in host memory 39. It then places this information in transmit command queue 280, thus avoiding the need for RISC engine 278 to recompute the information or for host CPU 33 to be involved in the retransmission in any way.

The history queue also logs the interleaving order between the send queue and the incoming read request queue for each RDMA connection. TCM 274 may then check, for a given packet sequence number, whether that particular packet was transmitted out of the send queue or the incoming read request queue.

The ACK messages 92 and completion messages 102 from receiver 40 (FIGS. 6 and 7) are passed to CCM 294, which queues the messages for processing by RISC engine 296. The CCM queues the messages and then passes them, together with the appropriate context information, to RISC engine 296 for processing. Based on these inputs, RISC engine 296 writes completion queue entries (CQEs) to host memory 39 by means of DMA requests 298 and replies 300. When it is necessary to send an ACK packet to a remote computer over network 24, RISC engine 196 passes acknowledgment instructions to TCM 274. Transmitter RISC engine 278 then generates the ACK packet parameters and places the ACK packet in queue 280 for transmission as pure or piggy-backed ACKs.

Doorbell Handling

Figure 9:
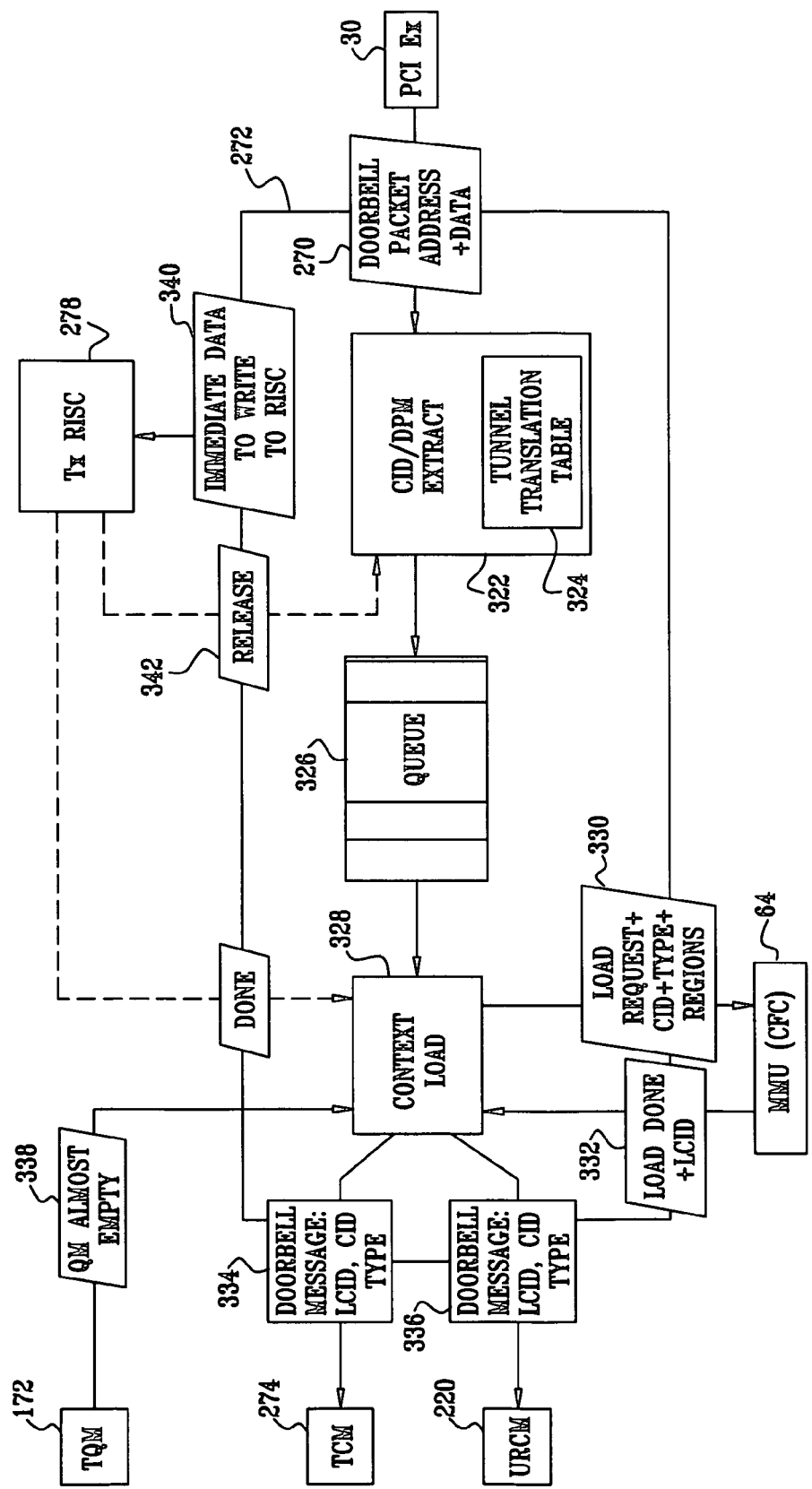
FIG. 9 is an exemplary block diagram of the doorbell processor of FIG. 8, in accordance with an embodiment of the present invention.

FIG. 9 is an exemplary block diagram that illustrates the doorbell queue 272 of FIG. 8, in accordance with an embodiment of the present invention. The doorbell queue block performs the following functions:
1. Extracting connection identifier (CID) and type from incoming doorbells from host 22.
2. Queuing doorbells for processing by TCM 274.
3. Loading context for the connections to which the doorbells belong.
4. Writing message payload data to transmitter RISC engine 278 in immediate mode.

These functions will be described further with reference to the figure.

To receive service from NIC 26, host processes write doorbells 270 in the form of packets sent to a specified address on bus 32. The doorbell packet contains a mode flag, which identifies it as either a normal mode or immediate mode doorbell. Each doorbell packet contains an address, which is used by a doorbell extractor 322 to determine the CID. When multiple RDMA connections are multiplexed (tunneled) over a single TCP connection, as described in the above-mentioned provisional application 60/626,283, the doorbell data contains a tunnel ID, which the doorbell extractor translates into the CID of the TCP connection using a tunnel translation table 324. In the case of immediate mode doorbells, the doorbell packet also contains the message payload for use by RISC engine 278 in building instructions to framer 62.

Extractor 322 places the doorbells in a queue 326, from which they are read out by a context loader 328. The queue entries contain the CID, connection type and doorbell type (transmit or receive). For each doorbell, the context loader submits a context load request 330 to MMU 64, specifying the CID, type and context regions that are required. The choice of regions to be loaded depends on the queue status of QM 172: When the queue is almost empty, the QM sends a message 338 to the context loader, causing the context loader to request both the TCP and ULP context regions. This choice reduces latency of subsequent transmit processing. On the other hand, when the queue of QM 276 is not almost full, only the TCP aggregation context region is loaded. (This region is used for aggregation of multiple doorbells and decision whether a sufficiently-long TCP window remains to permit transmission before invoking the RISC engine.)

The MMU 64 fulfills the load request and then responds with a load done message 332, which also specifies the local CID (LCID) cache entry number. For transmit doorbells, the context loader then sends a transmit doorbell message 334 to TCM 274, specifying the LCID, CID, and type of the packet to be generated. For receive doorbells, a receive doorbell message 336 is sent to URCM 220.

When extractor 322 receives an immediate mode doorbell packet, it writes immediate mode data 340 from the doorbell packet directly to the internal memory of transmitter RISC engine 278. The extractor then disables the immediate mode channel until the corresponding doorbell message reaches TCM 274. Upon receiving the doorbell message, the TCM instructs RISC engine 278 to process the message that was contained in immediate mode data 340. Thus, in contrast to the normal mode of processing that was described above with reference to FIG. 8, in direct packet mode there is no need for repeated DMA reads via bus 32 in order to bring the WQE and other data from host memory 39 to RISC engine 278. Immediate mode thus reduces the overall latency of transmitter 42.

In the disclosed embodiment, RISC engine 278 has only limited memory available, typically sufficient for only one or a small number of immediate mode message. Therefore, after RISC engine 278 has processed the immediate mode doorbell, it sends a release message 342 to extractor 322, indicating that the immediate mode channel may again be enabled.

Context Management and Caching

As illustrated by the description above, NIC 26 may be required to support many connections simultaneously, running a variety of different protocols. In the memory-free configuration of the NIC, with no dedicated high-speed memory 34, the context for all these connections is held in host memory 39. The context for each connection comprises multiple regions, including, for example, TCP and ULP regions, which are further divided into receive, transmit and completion regions, as well as aggregation regions (held by the context managers) and processor regions (which are loaded into the RISC engines during processing).

When a connection is to be served by receiver 40 or transmitter 42, MMU 64 is called upon to load the required context information into cache memory on NIC 26. Operation of the receiver and transmitter typically modifies the context in cache, and the modified context must be written back to host memory 39 before the cache can be overwritten with context information for other connections. Each read or write of context information from or to the host memory consumes cycles on bus 32. This same bus, meanwhile, is used by the transmitter and receiver for reading out data from host memory 39 for insertion into packets to be transmitted onto network 24 and for writing data from packets received over the network into the host memory. When NIC 26 is expected to process packets at the network wire speed (10 Gbps in the present example), and the wire speed is greater than half the bus speed (16 Gbps for PCI-Ex 8X), bus access becomes a key bottleneck in the system.

Therefore, to reduce pressure on bus 32 and thus maintain wire-speed throughput, NIC 26 implements a number of novel methods for reducing the bus bandwidth required for transferring context information to and from host memory 39. These methods include context caching by MMU 64, as described below with reference to FIGS. 10-12, in conjunction with context operations carried out by the context managers in the TCP-Rx, ULP-Rx, transmit, and ACK/completion processors described above.

Memory Management Unit

Figure 10:
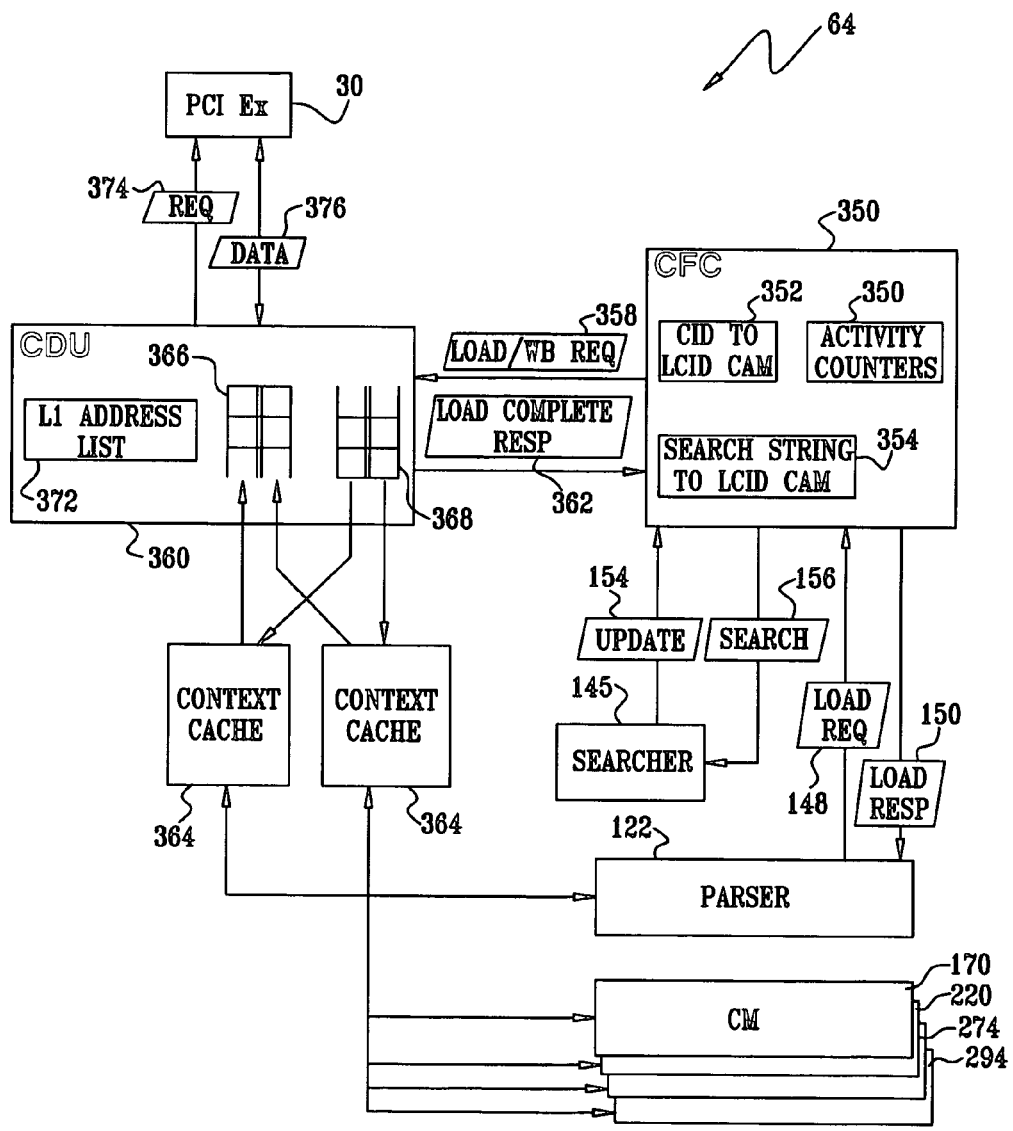
FIG. 10 is a block diagram that illustrates an exemplary memory management unit (MMU), in accordance with an embodiment of the present invention.

FIG. 10 is a block diagram that illustrates an exemplary memory management unit (MMU) 64, in accordance with an embodiment of the present invention. The MMU receives and processes data requests from clients, including context requests by doorbell queue 272, parser 122 and context managers 170, 220, 274 and 294. (The MMU 64 also processes address/data requests from clients such as data movers 178 and 226.)

The MMU 64 comprises a context fetch controller (CFC) 350 and a context distribution unit (CDU) 360. The CFC acts as a cache controller. It receives context requests from clients, checks whether the context is already loaded, and if not sends a request 358 to the CDU to load the required context. The CFC 350 also manages the free cache entries and initiates write-back (WB) requests to the CDU when the number of free entries falls below a certain threshold. The CFC 350 manages activity counters 350 per cache entry to detect when there is no longer activity on a cache entry, so that it can be taken out of the cache if needed. The CFC 350 uses content-addressable memories (CAMs) 352 and 354 to do permit quick searching of cached connections.

The CDU 360 holds cached context information in a level 1 (L1) cache memory 364. The cache memory is divided into multiple parts, corresponding to the different regions described above (TCP/ULP, receive/transmit, etc.) CDU 360 receives load and WB requests 358 from CFC 350. For each request, the CDU determines the corresponding address/data lines in cache memory 364 using a L1 address list 372, which holds the translation mapping. The CDU supports different context types for different types of connections (such as RDMA or TOE) in order to minimize memory bandwidth. Requests 374 to read data from or write back data to host memory 39 are entered in request queues 366, from which they pass to bus interface 30. Data 376 received from the bus interface are entered in data queues 368 for writing to cache memory 364. Upon completion of a requested cache load, the CDU returns a load complete response 362 to CFC 350.

When a client (such as parser 122 or one of the context managers) needs context data, it submits load request 148 to CFC 350. The load request indicates which context region is needed. If the required context region is already present in cache memory 364, the CFC 350 immediately returns load response 150 to the client, indicating the LCID of the requested data. Otherwise, the CFC submits load request 358 to CDU 360 and returns the load response after having received load complete response 362 from the CDU. Upon receiving the load response, the client asks to read the context data from the cache. After processing the packet or packets for which the context applies, the client may write a context update to the cache. In this case, the region that the client has updated is marked (using a flag bit) as "dirty."

The division of the context cache into regions thus saves considerable bandwidth in loading and writing back context data via bus 32. When a client requests context information that is not in the cache, only the specific region or regions required by the client are loaded from the host memory. Similarly, for writeback, only the specific regions that are marked as dirty needed be written to the host memory.

As a further means for saving bandwidth in loading and writeback of context data, some of the context parameters may be compressed. For example, timer values may be stored in logarithmic form, thus reducing the number of bits required at the expense of resolution in determining large timer values. Since long time spans generally do not have to be measured accurately in the operation of NIC 26, timer compression saves context bandwidth without substantial effect on performance. Other types of compression that may be applied will be apparent to those skilled in the art.

Figure 11:
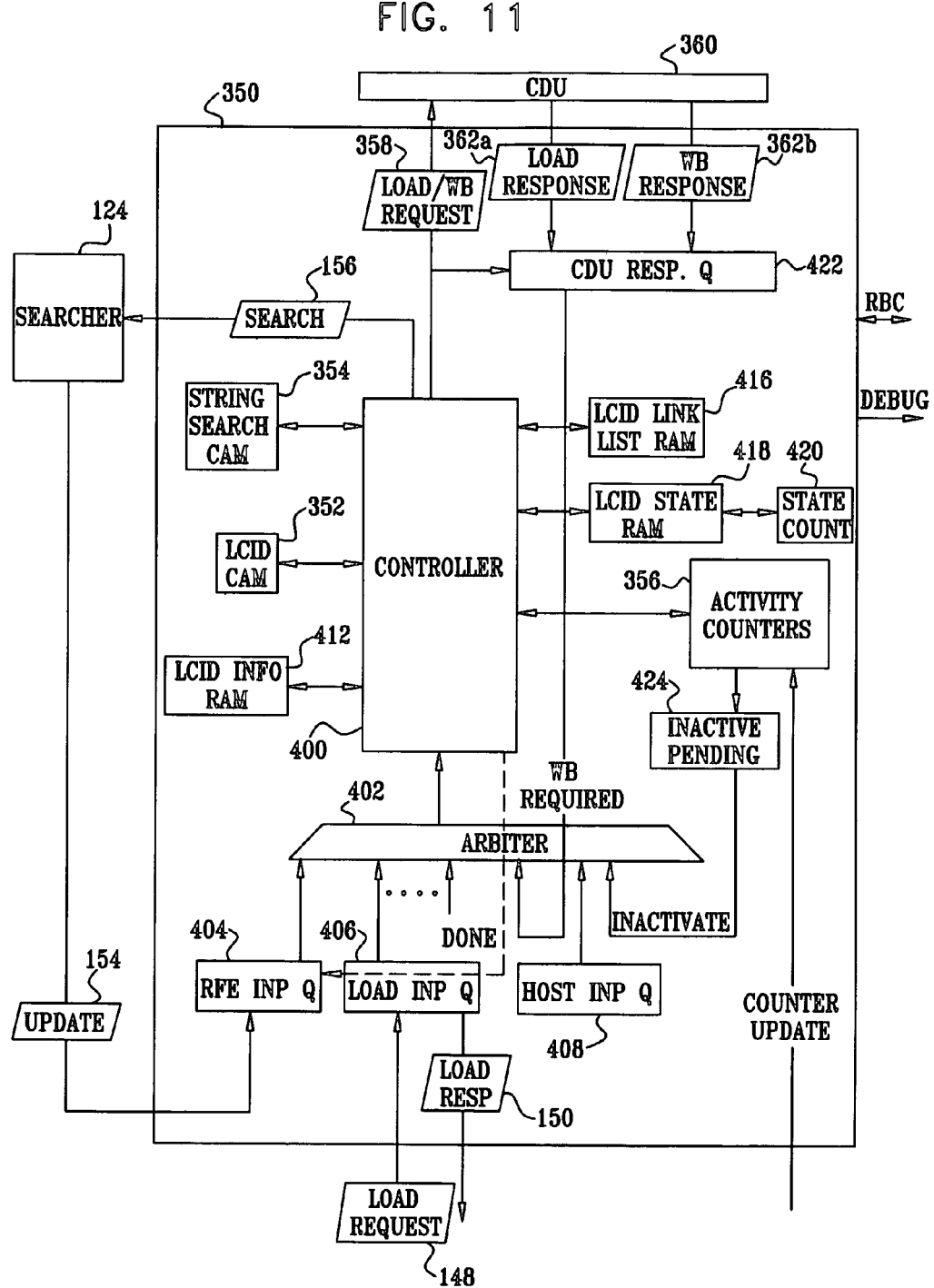
FIG. 11 is a block diagram that illustrates an exemplary context fetch controller (CFC), in accordance with an embodiment of the present invention.

FIG. 11 is a block diagram that illustrates an exemplary context fetch controller (CFC) 350, in accordance with an embodiment of the present invention. Each entry in the cache is identified by its local CID (LCID). A controller 400 may manage the cache using the following exemplary elements comprising a LCID state RAM 418, a state counter 420, an activity counter 356, an LCID CAM 352, and a 4-tuple search CAM 354. The LCID state RAM 418 may hold the cache state of each LCID (Empty, Inside—active, Inside—not active, Arriving, Leaving, Inside and outside). The RAM 418 may also hold the state of each region (empty, arriving, inside). The state counter 420 may indicate a state of each cache line (empty, arriving, clear, dirty, etc.). The activity counter 356 may count how many times each LCID in the cache appears in the processing blocks of the NIC. The data movers and context managers may provide counter updates. When a connection is no longer active (so that the corresponding counter value drops to zero) the activity counter places the connection in an inactive pending queue 424, indicating that the context for this connection can be written back to host memory 39 and replaced by another connection. The LCID CAM 352 may hold the CID of the connection corresponding to each LCID for convenient lookup. The 4-tuple search CAM 354 may hold the 4-tuple search string of the connection corresponding to each LCID. To obtain the search string for a given connection, controller 400 issues search request 156 to searcher 145, which responds with update 154 providing the search string.

An LCID information RAM 412 holds other information, such as type of the connection for each LCID (for example, RDMA, TOE, etc.) The CFC 350 transfers this information to the CDU to indicate the appropriate form of the context in host memory 39 and in L1 cache memory 364. RAM 412 may also hold the RSS field of the connection, indicating the designated host processor for non-offloaded connections, as explained above.

The controller 400 is fed by an arbiter 402, which arbitrates among the different clients of the controller. The client requests are queued in input queues 404, 406 and 408, in addition to the inactivate requests in queue 424. Context load requests may come from parser 122 or from any of the context managers described above. Clients are blocked if there are no free entries in the cache or if the CDU is full and cannot receive additional requests. Controller 400 issues load and writeback (WB) requests 358 to CDU 360. Load responses 362a and writeback responses 362b are placed in a CDU response queue 422. The CDU response may also indicate that a writeback is required when the number of free or clean cache entries drops below a certain threshold. In this case, the CFC controller initiates a writeback procedure, which is described hereinbelow with reference to FIG. 13.

Figure 12:
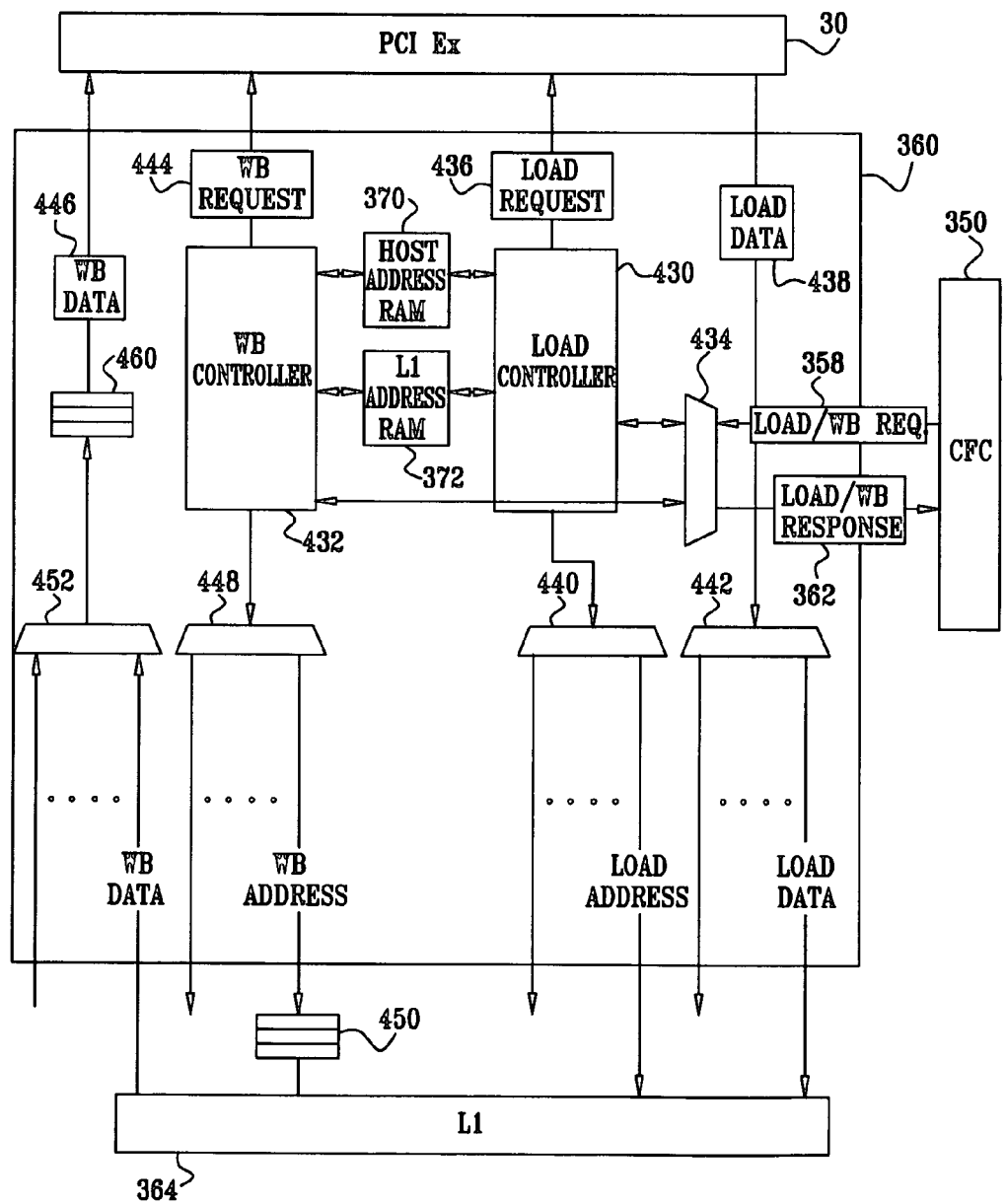
FIG. 12 is a block diagram that illustrates an exemplary context distribution unit (CDU), in accordance with an embodiment of the present invention.

FIG. 12 is a block diagram that illustrates an exemplary context distribution unit (CDU) 360, in accordance with an embodiment of the present invention. The functions of the CDU are performed by a load controller 430 and a writeback (WB) controller 432. A multiplexer 434 conveys requests 358 and responses 362 between CFC 350 and these controllers. The controllers share address RAM 372, indicating data locations in cache memory 364 for each LCID, and a host address RAM 370, for generating addresses for write and read requests to and from host memory 39 via bus interface 30.

The multiplexers 440 and 442 convey load addresses and data to the appropriate cache memory regions, while multiplexers 448 and 452 convey writeback addresses to the memory regions and writeback data from these regions. The writeback addresses and writeback data are held in respective queues 450 and 460 while awaiting writeback (since writeback typically occurs as a background process, with lower priority than context loading). Load controller 430 submits load requests 436 via bus interface 30, whereupon context data 438 are returned for loading into cache 364. Writeback controller 432 similarly submits writeback requests 444 via bus interface 30, following which context data 446 are written back to the host memory.

Zero-Latency Cache Loading

In caching schemes known in the art, when the cache is full and a new cache line must be loaded from host memory, the least-recently-used (LRU) cache line is identified and written back to the host memory. Only after writeback can this cache line be overwritten with the new line. This scheme necessarily results in added latency in loading the new line into cache.

Figure 13:
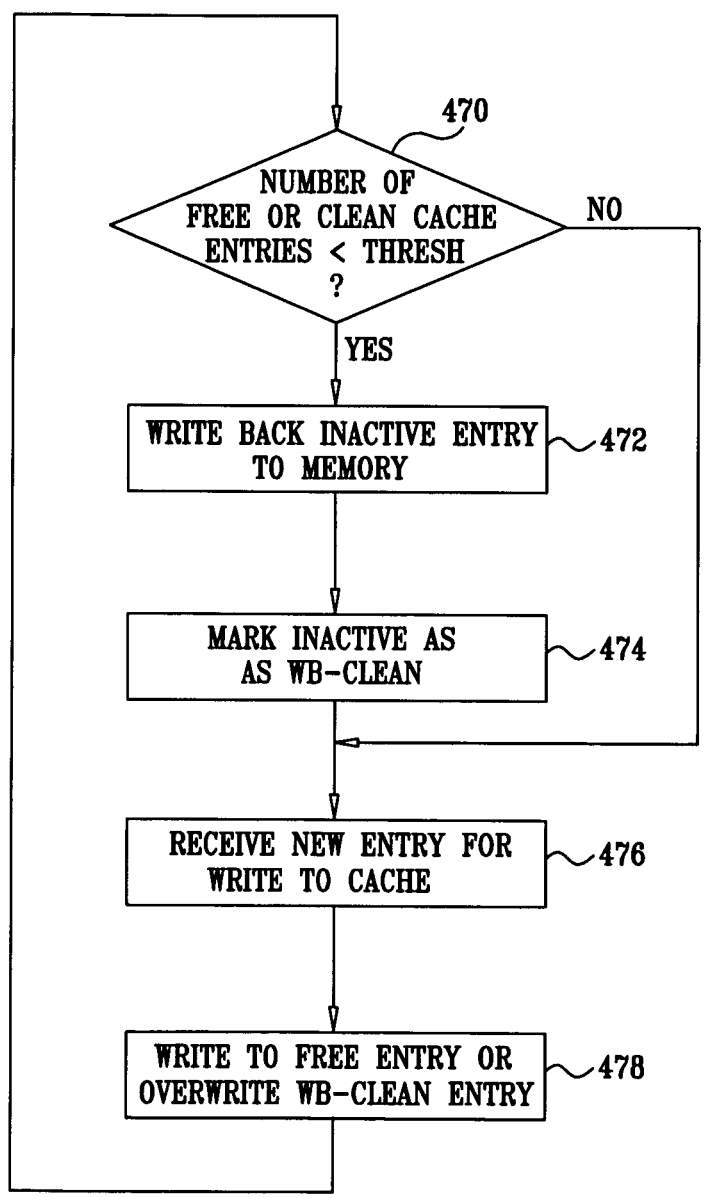
FIG. 13 is a flow chart that illustrates exemplary steps for cache management that address latency issues, in accordance with an embodiment of the present invention.

FIG. 13 is a flow chart that illustrates exemplary steps for cache management that address latency issues, in accordance with an embodiment of the present invention. This method in this embodiment is implemented by MMU 64 in managing cache memories 364. (It may similarly be implemented in other processing environments in which low-latency cache loading is beneficial.) The method is invoked when CDU 360 determines that the number of free or clean entries in the cache is less than a predetermined threshold, at a cache evaluation step 470. Alternatively, the method may be invoked when the number of clean cache lines (i.e., those for which the "dirty" flag mentioned above is not set) drops below a threshold.

In response, CDU 360 writes one of the cache lines back to host memory 39, at a writeback step 472. Typically, the cache line that is written back is one of the dirty lines that is not currently in use in any of the processing circuits in NIC 26. For example, as noted above in the description of CFC 350 (FIG. 11), activity counters 356 measure the level of activity on each connection in the cache, and then enter connections with zero activity in queue 424. CFC controller 400 passes these entries to CDU 360 for writeback. (Entries may be locked in the cache by artificially incrementing the corresponding activity counter, so that its value never drops to zero.) The corresponding cache lines of connections in queue 424 are not written back immediately, but rather when step 470 indicates that writeback is necessary. The entries in queue 424 are generally assigned for writeback in queue order, so that the entry that has had the longest period of inactivity is written back first. Alternatively, the least-recently-used cache line may be selected for writeback, or other inactivity criteria may be applied. Further alternatively or additionally, if certain types of connections are considered to be particularly latency-sensitive, these types may be assigned low priority for writeback, thus decreasing the likelihood that the cache lines corresponding to these latency-sensitive connections will be overwritten.

As noted earlier, CDU 360 does not necessarily write back the entire cache line of the inactive connection, but only those regions of the cache line that are marked as dirty. Furthermore, the writeback operation may be assigned a low priority, since there is no immediate need to overwrite the cache line in question. The writeback will then be performed during free cycles of memory 364 and bus 32, when it will not affect the latency of memory and bus operations.

After writing back the contents of the selected inactive cache line to the host memory, CDU 360 marks the line as writeback-clean, i.e., it resets the dirty flags in the cache line, at a line marking step 474.

Subsequently, the CDU receives data to load into the cache from bus interface 32 at an entry loading step 476. If there is a free entry in cache memory 364, the CDU writes the data to the free entry, at a cache writing step 478. If there is no free entry, however, the CDU simply overwrites an inactive entry whose cache line is clean. Thus, even when the cache is full, new context may be loaded with zero latency without loss of the overwritten data.

Aggregation of Context Updates and RISC Invocation

As noted earlier, the context managers in NIC 26 maintain and update context information that is in use by the respective RISC engines. For example, as shown in FIGS. 5 and 6, TRCM 170 and URCM 220 have respective caches 171 and 221, and receive context updates 176 and 226 from RISC engines 82 and 96, respectively. These context updates must be written back by the context managers to cache memory 364 in MMU 64. Each write operation, however, consumes a part of the available bandwidth of the cache, regardless of the number of bits of data that are actually updated (up to the width of the data transfer bus).

In order to conserve cache bandwidth, the context managers apply context aggregation and decision rules in determining when to write a context update to the cache. In this manner, each context manager typically collects multiple updates generated in the course of processing a given connection, and then aggregates them together into a single write operation to MMU 64. The context write may be triggered, for example, when a certain quantity of update data has been aggregated, or upon occurrence of some event that prompts a write decision.

The context managers also use aggregation and decision rules to reduce the frequency with which they must invoke the corresponding RISC engines. For example, as noted above, TCM 274 may aggregate multiple doorbells on a given connection and then invoke transmitter RISC engine 278 only once to service all the doorbells, on condition that a TCP window is available for transmission. The RISC engine will then scan the entire transmit queue for the connection and may process multiple work requests in immediate succession, as described hereinbelow, for example.

Thus, only the CID is held in the queue for processing by the RISC engine. When NIC 26 receives multiple work requests for the same connection, only the first work request causes the CID to be registered in the queue. When TCM 274 passes a new CID to transmitter RISC engine 278 for processing, the RISC engine checks whether there are additional work requests pending for that particular connection. In certain cases, as described below, the RISC engine groups together multiple work requests that belong to a single sequence of operations. Otherwise, when subsequent work request do not fall into such combined sequences, the RISC engine re-registers the connection at the tail of the queue. As a result, the queues are compact, and fairness is maintained among multiple connections.

Only a small portion of the context is needed by the context manager for aggregation and decision purposes. This portion is stored in the aggregation context region of MMU 64. The CM loads the full context only if and when it determines that the RISC engine should be invoked.

Context-Efficient Transmit and Receive Flows

Receiver 40 and transmitter 42 apply novel queue management techniques in order to perform operations in ways that enhance context caching efficiency. A number of examples are presented below:

Application flows typically involve multiple work requests in sequence, such as bind-send and write-send operations in RDMA flows. These operations are normally queued for execution by NIC 26 in the order in which they are submitted by the host application. Instead of processing the work requests in strict queue order, however, transmitter RISC engine 278 may look ahead down the queue and group together requests belonging to the same application flow.

For instance, the send queue on the initiator side of an RDMA connection often comprises a bind request (a management operation that involves context but does not cause transmission of any packets over network 24), followed by a send request (which does lead to packet transmission). Upon detecting this bind-send sequence, the transmitter RISC engine moves the send request ahead in the queue so that the bind and send operations are performed in immediate succession. As a result, the required context remains in cache, thus eliminating extra context transfers over bus 32, and the send latency is also minimized. The transmitter may similarly process write-send sequences in immediate succession. After the bind-send sequence (or write-send) is completed, the initiating application waits for the packet target to respond to the request. In the meanwhile, NIC 26 processes work requests from other application queues.

Although the above-mentioned bind-send and write-send sequences each comprise only two commands, in practice the RISC engine may group multiple commands on the same connection for processing in immediate succession. For example, the RISC engine may process multiple write requests followed by a send.

As another example, the context managers in NIC 26, such as TRCM 170 and URCM 220, may look ahead to the operations that are queued by the corresponding queue managers in order to determine which items of context data will be required when these operations come up for processing. Upon determining that the TOE or RDMA context for a given connection will be required, for instance, the context manager may prefetch the required context data from MMU 64 and place the context data in its own cache (such as caches 171 and 221). Prefetching context data in this manner reduces the latency of operations by the RISC engines. It also helps to conserve context bandwidth, since it can take advantage of any unused transfer capacity that is available.

Yet another example of context bandwidth conservation involves the use of credit updates 104 from ULP-Rx processor 94 to TCP-Rx processor 80 (FIGS. 3, 5 and 6). The ULP-Rx processor may use these credits, for example, to inform the TCP-Rx processor of the availability of buffers in host memory 39 for the data carried by incoming packets on various connections. When the number of credits on a given connection is too small, the TCP-Rx processor discards incoming packets on the connection. Discarding the packets at this early stage saves processing bandwidth and avoids the need to load context information for the connection in question, thus conserving context bandwidth, as well. In another embodiment of the invention, the In another embodiment of the invention, work requests may be processed iteratively to achieve the same result. With this implementation strategy the transmit RISC engine continues to process work requests for the QP until one of the following conditions is met: (1) There is no more TCP credit for the connection; (2) An assigned quota for the QP has been exhausted. The quota may be assigned by the dispatcher to prevent any one QP from blocking output from all other QP for to long of a period. A single work request may request up to, for example, 2 GBs and TCP credits may be quite large on an uncongested network. Allowing a single QP to block other QPs for the duration of a maximum TCP credit may be frequently undesirable. For example, there may be instances when it is desirable for a single QP to block all other QP for the duration of a maximum TCP credit; (3) The current work request is 'fenced', which means that the current work request may be logically held by the specific Upper Layer Protocol, and as a result of some condition, this output may not be sent at this time. For example, in RDMA an operation may be fenced to wait for a prior RDMA read operation to complete; and (4) At least one work request has been processed and this will cause a completion at the remote peer. For example a RDMA read reply message or an untagged RDMA message was sent.

Optimizing Use of the Host Bus

The embodiments described above relate to methods and designs for reducing processing latency and context bandwidth demands within NIC 26. These methods and designs are intended, for example, to reduce the bandwidth demands placed on bus 32. They are complemented by the methods and designs implemented in bus interface 30, which aim to make the most efficient use of the available bus resources. It will be understood, however, that the methods described above may be used together with other sorts of bus and memory access schemes. Similarly, the bus access schemes described below are of more general applicability and are not limited to the types of data clients described above.

Figure 14:
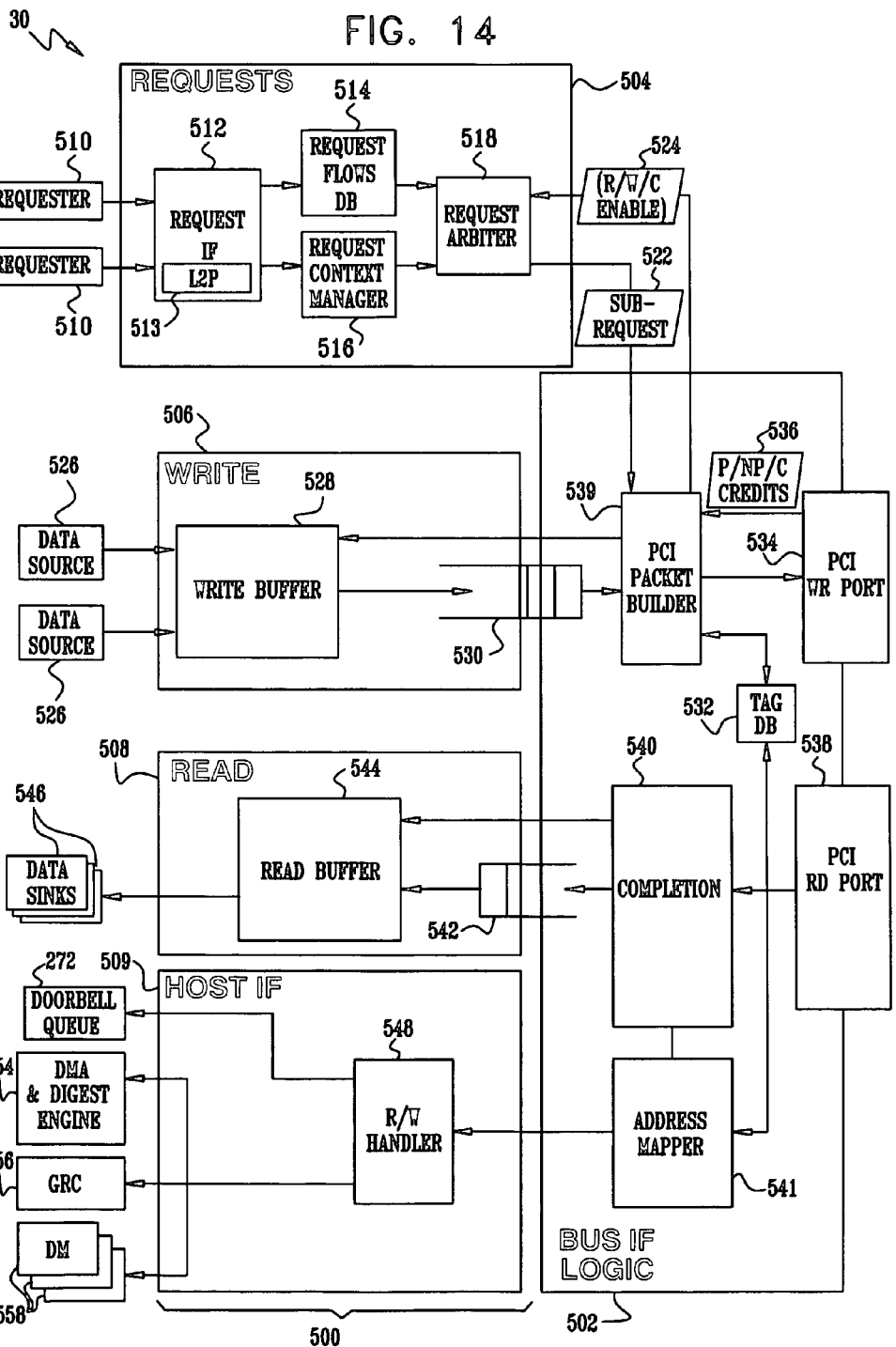
FIG. 14 is a block diagram that illustrates an exemplary bus interface, in accordance with an embodiment of the present invention.

FIG. 14 is a block diagram that illustrates and exemplary bus interface 30, in accordance with an embodiment of the present invention. As noted earlier, this bus interface is designed to work with the PCI-Express packet bus. The principles of this design, however, may be implemented in interfacing with buses of other types, as well. In one embodiment of the invention, the bus interface may comprise two main parts, namely buffer 500 and bus interface logic 502. The buffer 500 may be utilized to communicate with PCI clients in NIC 26. The bus interface logic 502 may interface with the actual PCI packet switch via a write port 534 and a read port 538. A request processor 504, a write processor 506, a read processor 508, and a host interface unit 509 may be communicatively coupled to the buffer 500.

The requesters 510 (i.e., PCI-Ex clients) submit requests to a request interface module 512. The requesters include, for example, CDU 360, searcher 145, and the data movers that are associated with the various RISC engines in the transmitter and receiver. Each request has a request ID, which is a local sequence number used by this specific client. The bus interface inserts this number in done indications and read completions that are returned to the client. The requester further specifies to which virtual queue each request should be added. A VQ is an ordered list of requests, which are handled in order by bus interface 30. Typically, each application flow in NIC 26 has its own VQ, thus guaranteeing that transactions for each flow will be handled in order and that bus bandwidth is divided per flow, rather than per requester. For example, write requests whose payload arrives from the same data port on network 24 are added to the same VQ, so that the payload will be associated with the correct request. Different requesters may submit different requests to the same VQ, thus synchronizing their host writes. Read requests that depend on writes, as well as read requests that should be returned to the requester in a specific order, are likewise appended to the same VQ. Requests that depend on a read request (i.e., they are added to the VQ behind the read request) are handled when the read request has been submitted to interface logic 502, without waiting for the read completion to arrive before handling the next request on the list. Read processor 508 then handles the completions (which may return out of order).

The requests submitted to bus interface 30 include addresses, but the requester may use a logical address instead of a physical one. A logical to physical (L2P) translator 513 translates the logical addresses into physical addresses using static translation values in an on-chip translation table. The translation table for each CID assumes allocation of contiguous blocks of a certain size (such as 128 KB), but still allows for the possibility that some allocations may not be contiguous. If the requested logical address is not present in the table, the L2P translator submits its own special read request to a host-memory translation table, using pointers to the table that are stored on-chip, as well. For example, if the table can reside over at most sixteen contiguous blocks of host memory, then sixteen pointers are held on-chip to map the table. The physical address is then returned to the requester.

The L2P translator 513 can be used in this manner to find physical addresses by dependent read operations. For example, one of requesters 510 may specify a hash code provided by searcher 145 in order to find the corresponding connection iD (CID) in a first read operation. The searcher table is then addressed by a logical address. The search entry can have two pointers: (1) If there is a match on the 4-tuple, the pointer indicates the physical address of the context for the CID, so that a translation for context address is not required on the receive path. (The translation is still required on the transmit path, however, since context load for transmission is initiated by the doorbell and addressed by CID, which is part of the doorbell, and not by the 4-tuple as on the receive side.) (2) If there is no match to the 4-tuple, to the searcher traverses a linked list in the hash table, so that the pointer to the next item on the list is a physical address pointer, rather than logical. Consequently, in dependent reads, although the first request may specify a logical address, the data structures in memory 39 are arranged so that subsequent requests refer to physical address pointers.

The request interface 512 passes the request context for each request to a request context manager 516 and enters each request in the appropriate VQ in a request flows database 514. A request arbiter 518 reads the requests out of the VQs, divides the requests into sub-requests (SRs) 522, and submits the SRs to a PCI packet builder 539 in interface logic 502. Each SR is identified by a unique ID. The SR is the actual PCI-Ex transaction and complies with the bus rules (such as maximal read request size, maximal payload size, etc.) Typically, the arbiter defines the SRs so that the size of packets built by packet builder 539 is as close as possible to the maximal payload size on bus 32, thus minimizing the packet overhead.

Arbiter 518 receives read/write/completion enable messages 524 from packet builder 539, indicating whether resources are available to process the SRs. The arbiter does not submit SRs to the packet builder unless the resources are available. Thus, request processor 504 uses back-pressure to avoid asking for memory bandwidth before bottlenecks occur on bus 32.

The data sources 526 place payloads to be written to the host in a write buffer 528 via write data ports of write processor 506. Each requester has a unique data port for write. The sizes of the buffer allocations are adjusted to the typical payload sizes of the specific data sources. The port assignments are passed on to packet builder 539, which uses the port assignments to determine the buffer location from which to take the payload data for each bus write. When the packet builder receives enough credits 536 to send a write request to host 22, it reads the payload data from write buffer 528, and inserts the data in a packet that is transferred to PCI write port 534.

Completion logic 540 receives incoming responses from PCI read port 538. Responses to read requests submitted by requesters 510 comprise payload data, which the completion logic places in a read queue 542. When a completion arrives, completion logic 540 passes a notification to read processor 508, including the SR ID. The read processor translates the SR ID into a buffer index in a read buffer 544, where the incoming payload should be placed. (The translation table for this purpose is prepared by request processor 504 when the SR is submitted.) Read buffer blocks are allocated on demand, but arbiter 518 does not issue a SR until it has ascertained that are enough free blocks to accommodate the SR in the read buffer.

When a block arrives in read buffer 544 in order (i.e., all the previous SRs and blocks have been delivered), read processor 508 transfers the block to an appropriate data sink 546, as indicated by the corresponding request. Data accumulating in the read buffer may be delivered to the data sink even before all the requested data (or even the data requested in the current SR) have reached the read buffer, in order to reduce latency and to empty the buffer as quickly as possible.

An address mapper 541 in interface logic 502 passes read and write requests initiated by host processor 22 to host interface processor 509. A read/write handler 548 passes the host requests to the appropriate locations in NIC 26, such as doorbell queue 272, data movers 558, general chip register file (GRC) 556, and a DMA and digest engine 554. The DMA and digest engine is used in CRC computation offload, as described below with reference to FIG. 18, as well as for copying from host memory to host memory in order to avoid copying by the CPU in TOE operation.

The PCI packet builder 539 receives SRs from arbiter 518 for the next read request, write request and completion request, for each of the VQs. (For example, if there are two VQs, the PCI packet builder may hold up to six pending SRs.) As noted above, the packet builder keeps track of credits 536 received from host 22 and prepares packets for transmission on bus 32 accordingly. For each read request submitted by one of requesters 510, packet builder 539 takes a tag from a tag database 532 and attaches the tag to the packet header. The tag database keeps track of released tags and consumed tags, along with a mapping between each tag and the corresponding SR ID. This mapping is used by completion logic 540 in associating each completion packet received from the host with the appropriate SR. When the number of bytes received in a given completion equals the number of bytes expected, the tag is released.

Figure 15:
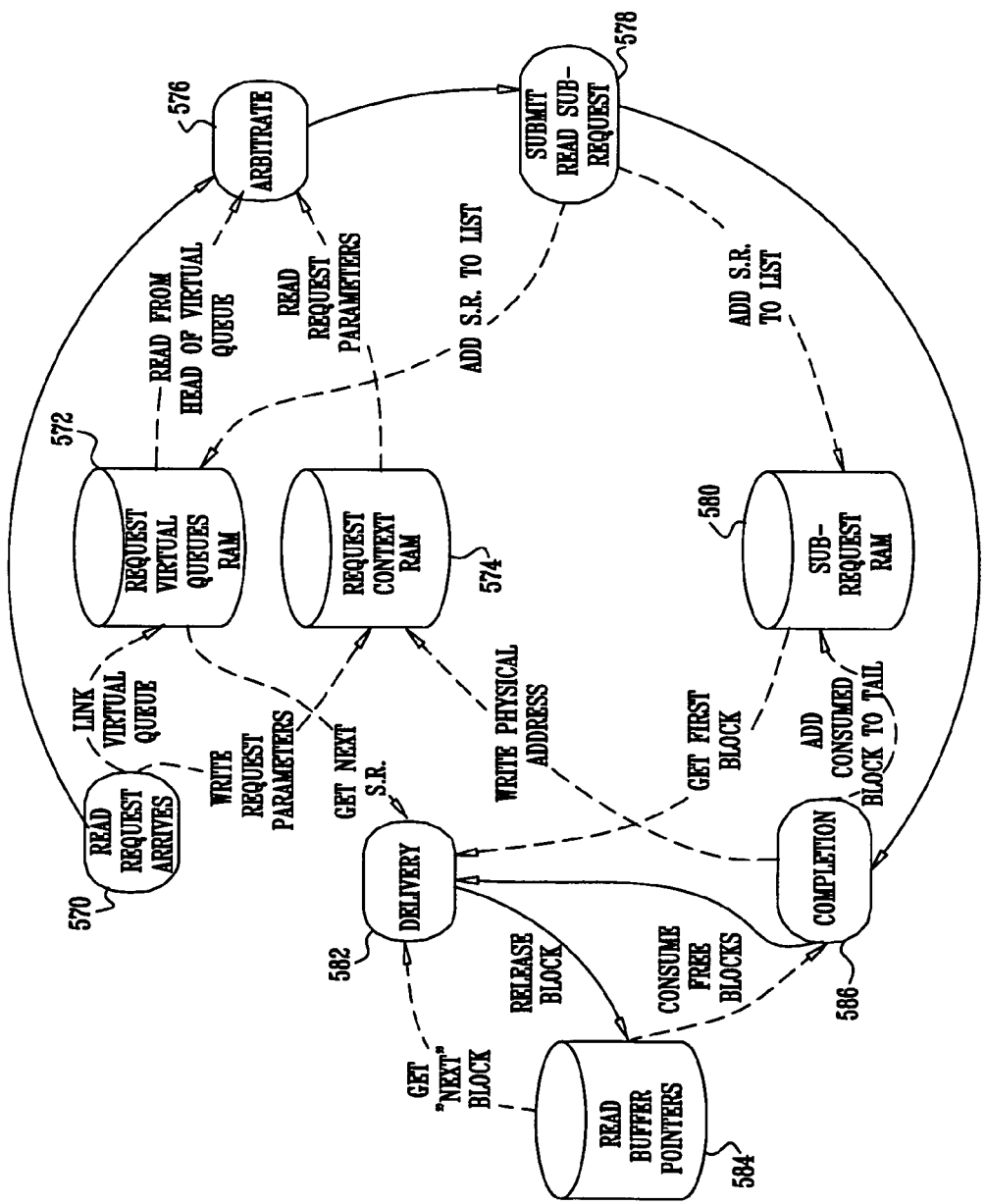
FIG. 15 is a block diagram that illustrates exemplary operations of the bus interface of FIG. 14, in accordance with an embodiment of the present invention.

FIG. 15 is a block diagram that illustrates exemplary operations of the bus interface 30 of FIG. 14, in accordance with an embodiment of the present invention. The flow is initiated when a read request arrives from one of requesters 510, at a read request step 570. Request interface 512 links the request to the designated virtual queue (VQ) in a VQ RAM 572 (associated with database 514), and writes the request parameters to a request context RAM 574 (associated with manager 516). Arbiter 518 chooses a request from the head of one of the VQs in VQ RAM 572, at an arbitration step 576, and reads the corresponding request parameters from request context RAM 574.

Typically, arbiter 518 applies a weighted fair queuing (WFQ) scheme in order to choose the VQ from which to take a request at each pass through step 576. As noted earlier, each VQ belongs to a certain application flow, so that the arbitration is applied on a per-flow basis, as opposed to bandwidth sharing among requesters, as in bus arbitration schemes known in the art. In NIC 26, a given requester, such as CDU 360 or TRCM 170, typically participates in multiple different flows, and places its bus requests in the appropriate VQ for each flow. For example, TRCM 170 may participate in TOE flows, RDMA flows, and iSCSI flows, and may place its requests for each flow type in a different VQ.

The weights applied in the WFQ arbitration scheme may be chosen according to the relative demand that each flow is expected to make on the bus resources. For this purpose, the actual bus use and traffic mix of the different flows may be measured over the course of a test period (for example, one week) under real operating conditions. The measurement results may be used in computing weights, which are then programmed into arbiter 518. Thus, the arbiter will allocate the bus resources in a manner that optimally matches the needs of NIC 26 and applications running on host 22, and thus minimizes bus latency and wasted bandwidth. The measurement results, and consequently the weights, are likely to vary from one host to another, depending on the application environment and system configuration, and the programmed weights may be updated from time to time. Alternatively, weights may be determined a priori based on estimated system characteristics.

After choosing the appropriate request to be serviced, arbiter 518 submits a read SR to PCI packet builder 539, at a SR submission step 578. The SR is added to the list held in VQ RAM 572. The arbiter need not submit all the SRs corresponding to a given request in succession, but may rather interleave SRs from different requests. This sort of interleaving tends to reduce latency in servicing of the sub-requests by host 22, since some requesters typically request short DMA transactions for control information and require a small portion of the bus bandwidth, but are latency-sensitive since they cannot process another request until they receive the requested data from host memory. Packet builder 539 adds each SR to a list in a sub-request RAM 580.

A read response returns from PCI read port 538 at a completion step 586. If the response gives a physical address (in response to a request for resolution of a logical address, as described above), the physical address is written to request context RAM 574. The payload is delivered to read buffer 544, at a delivery step 582. For this purpose, free buffer blocks from a read buffer pointer list 584 are consumed and added to the tail of a linked list in SR RAM 580. At step 582, read processor 508 reads the next SR to deliver from VQ RAM 572, reads the location of the first block containing the response payload from SR RAM 580, and passes the payload to the appropriate data sink 546. It then releases the block in list 584, releases the SR in VQ RAM 572 and proceeds to the next SR.

Multi-Port Operation with Shared Processsing Pipeline

Referring back to FIGS. 1 and 2, it can be seen that although NIC 26 has two physical ports 28 to network 24, the ports share the same transmitter 42 and receiver 40 and the same bus interface 30. The dual ports may be used for purposes of failure protection, or they may be used to carry Ethernet traffic simultaneously. In either case, sharing the protocol processing and bus interface resources between the ports saves chip area and cost, by comparison with conventional schemes in which each NIC chip has a single network port.

Host operating systems, such as Windows®, are typically built on the assumption that each port is supported by separate hardware. The operating system provides a separate driver instance for each port, and assumes the ports and driver instances are independent of one another. (For instance, there can be no global spin lock shared between driver instances.) Similarly, traffic on one port must not visibly affect the other port. Thus, when NIC 26 is operated in a Windows environment (or another software environment with the above characteristics), the processing resources of the NIC should be shared and managed in a way that is transparent to the host operating system (OS). Some of the methods that are used for this purpose are described hereinbelow:

Resource Sharing

As shown in FIG. 2, buffer 48 has multiple inputs (one from each port) and a single output to the shared receive pipeline. Each port receives a certain minimum buffer allocation, while the rest of the buffer is dynamically shared between the ports on a first-come, first-served basis. When sending pause 121 to the transmitter, different thresholds may be applied to the two ports. For example, in a protection configuration, the standby port may have a lower pause threshold than the active port. (The pause is used to tell the switch in network 24 to which port 28 is coupled to stop sending packets to the NIC and buffer all incoming packets in it's the switch buffers.)

Other resources may be shared on either a dynamic or a static basis. For example, cached resources, such as LCID, cached STAGs, RISC engine threads, and PCI-Ex bus bandwidth, are typically shared dynamically. Long-term resources, such as CID, MR and MW, are shared statically.

Some resources may still be provided separately for the different ports. Examples include post-MAC packet filters, clocks configurations, and collection (as well as reset) of port statistics.

Port Coordination

The driver software for NIC 26 running on host 22 uses management processor 66 for coordination among different driver instances. (There is no coordination between the driver instances at the driver level.) The management processor is responsible for approving any operation that has to be synchronized between the driver instances. Before beginning a firmware download, for example, each driver must first request management processor approval. The management processor replies with approval (if this is the first driver) or with a "downloaded" or "downloading" reply (if this is the second driver and firmware is already downloaded or downloading). Upon receipt of the approval, the driver downloads the firmware. The management processor will send both driver instances an indication when the download is completed in order to allow the driver to continue with subsequent dependent operations. If a driver instance gets stuck in the middle of the download process, the management processor will indicate that this is the situation, and either driver instance may then initiate reload and reset of the NIC.

Power Down

Figure 16:
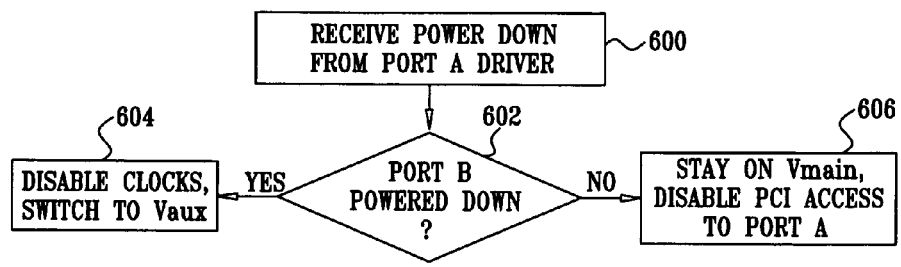
FIG. 16 is a flow chart that illustrates exemplary steps for handling power management from drivers 37 of FIG. 1, in accordance with an embodiment of the present invention.

FIG. 16 is a flow chart that illustrates exemplary steps for handling power down commands from drivers 37 of FIG. 1, in accordance with an embodiment of the present invention. As noted above in reference to FIG. 2, when NIC 26 is powered down, only certain islands 65 remain under auxiliary power, while the rest of the chip is powered off. If only a single port is "powered down," however, the other port must continue to operate normally. In FIG. 16, the ports are referred to arbitrarily as port A and port B.

The method of FIG. 16 is initiated when NIC management processor 66 receives a power down command from either of the port drivers, at a command input step 600. It is assumed arbitrarily that the port A driver issues the command. The management processor checks to determine whether port B has already been powered down, at a port checking step 602. If so, the management processor disables the clocks and switches over to auxiliary power Vaux, at a full power down step 604. Otherwise, if port B is still active, the management processor keeps NIC 26 under full power Vmain, with clocks running, at virtual power down step 606. In accordance with the power down command, however, port A is "virtually disabled," i.e., the management processor configures the port so that it will not accept PCI transactions, even though the hardware resources remain available.

Wake-up from the powered-down state is similarly carried out on a per-port basis. When one port is powered up, the other port remains disabled until it gets its own wake-up command. When both ports are in a cold power down state, and one port discovers a wake-up frame, NIC 26 waits for a PCI reset without changing the state of any port.

Diagnostics and Utilities

Diagnostic routines through each port include loopback and interrupt tests. For memory tests, handlers on the RISC engines may be used to verify that parity errors do not occur in the data written in memory. This sort of parity test is preferable to active memory tests in which memory contents may be overwritten, since an active memory test on one port will affect traffic on the other port. Parity testing can be done in run time on one port without affecting traffic on the other port. If a parity error is discovered, it is preferable that NIC 26 not be immediately reset, since the other port may still be transferring traffic, but rather that both ports fail gracefully.

A user may run a utility to update non-volatile RAM (NVRAM) on a per-port basis, while the other port is transferring user and/or management traffic.

Halt and Reset

Figure 17:
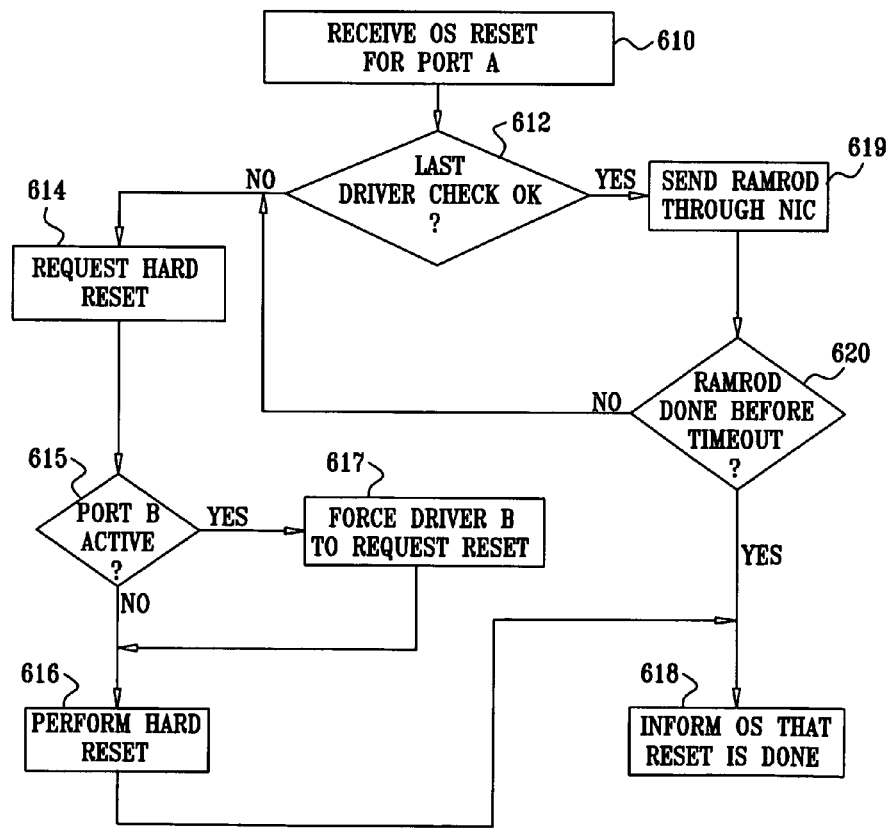
FIG. 17 is a flow chart that illustrates exemplary steps for resetting a network interface device, in accordance with an embodiment of the present invention.

FIG. 17 is a flow chart that schematically illustrates a method for handling a driver reset request, in accordance with an embodiment of the present invention. It is arbitrarily assumed that the request is submitted by host operating system 35 to the driver instance associated with Port A, at a reset submission step 610. During normal operation of NIC 26, driver 37 (FIG. 1) and management processor 66 (FIG. 2) periodically exchange "heartbeat" messages. A normal response to the heartbeat message by the management processor indicates to the driver that the NIC is operating properly. (Similarly, a normal heartbeat message from the driver to the management processor indicates to the management processor that the driver is alive and operating properly.) In order to determine how to handle the reset request, the driver checks the status of the latest heartbeat, at a driver checking step 612. A "failure" response from the management processor indicates to the driver that an error has occurred in the NIC (or that the driver instance associated with the other Port has requested a reset, as explained below).

Additionally or alternatively, a hardware reset may be invoked in response to a report from host coalescing block 55 (FIG. 2) to driver 37 that a hardware error has occurred.

If the driver received a heartbeat failure at step 612, it issues a hardware reset request to management processor 66, at a reset request step 614. The management processor then checks whether Port B of NIC 26 is active (based on the Port B heart-beat, as described above), at a second port checking step 615. If Port B is inactive, the management processor is free to proceed with the hardware reset, at a hard reset step 616.

If Port B is active, however, a hardware reset may cause an irrecoverable error in the driver instance associated with Port B, which may cause the operating system to crash. To avoid this possibility, management processor 66 forces the Port B driver instance to request a hard reset, at a driver forcing step 617. As noted above, the management processor may elicit the Port B reset request by returning a heartbeat failure response to the Port B driver instance (even though there is, in fact, no actual error that would cause such a failure). The Port B driver instance will inform the operating system of the heartbeat failure and will then submit its own request to reset NIC 26. Upon receiving this request, the management processor performs the hardware reset at step 616.

Following the reset at step 616, the management processor informs driver 37, which in turn informs operating system 35 that the reset is done, at a reset completion step 618.

Alternatively, if the Port A driver instance determines at step 612 that there was no error in the last heartbeat reply from management processor 66, then a hardware reset of NIC 26 is unnecessary. Furthermore, an unnecessary hardware reset is undesirable, since it will also disturb operating system and application functions that are using Port B. Therefore, when the heartbeat is found to be sound at step 612, the Port A driver instance sends a software reset, referred to herein as a "ramrod," through the NIC to flush out the Port A processing chain, at a ramrod transmission step 619. In contrast to a hardware reset, the ramrod does not affect the Port B processing chain.

The Port A driver instance waits for the software reset to complete successfully, at a ramrod completion checking step 620. If the reset is completed successfully within a predetermined timeout period, the driver instance informs that operating system that the reset has been completed at step 618. Otherwise, the driver instance concludes that a hardware reset is required, and instructs management processor 66 to perform the reset at step 614, as described above.

In contrast to the reset requests described above, when one of the driver instances requests a halt, management processor 66 will invoke a hardware reset even if there is no indication of a hardware error or heartbeat failure. In response to the halt request, the management processor jumps directly to step 614 in FIG. 17, and then proceeds as described above.

Nic Shared by Multiple Operating Systems

As shown in FIG. 1, NIC 26 may be shared among multiple hosts 22a, 22b, . . . , and among both a master operation system 35 and one or more virtual operating systems 36 on any given host. Virtualization software that is known in the art, such as VMWare and Xen, mentioned above, uses a "hypervisor" adapter layer between the master operating system and virtual operating systems running on the same platform. In conventional systems, communication packets that are sent and received by the virtual driver of the virtual operating system pass through a virtual switch in the hypervisor, and are actually transmitted and received over the network by the physical driver of the master operating system. The extra layer of packet processing causes performance degradation and prevents the virtual operating system from exploiting hardware acceleration of protocols such as TCP, RDMA and iSCSI.

As noted in reference to FIG. 1, NIC 26 is able to offer protocol acceleration to virtual operating systems by interacting with two drivers: physical driver (PDR) 37 working in master OS 35, and virtual driver (VDR) 38 working in virtual (guest) OS 36. The physical driver handles resource allocation between virtual operating systems, chip initialization and reset, and other operations that are not time-critical. Cut-through communication takes place between NIC 26 and VDR 38 (for TOE offload service) or between the NIC and the guest user application (for RDMA, for example) running over the virtual OS, thus bypassing the hypervisor.

NIC 26 is aware of every virtual OS running on host 22 and has specific resources allocated to each OS, since loading the corresponding virtual driver 38 connects with the hypervisor, which invokes the resource allocation by the NIC. For example, the NIC has separate CIDs, ring buffers, and event and command queues (at least one pair) for each OS. These resources may be further separated by port, protocol, etc. Since CIDs are statically divided among the virtual operating systems, the set of active CIDs might not be contiguous. To save PCI bandwidth in timer scans, for example, NIC 26 may maintain a base CID for each OS and scan only the active connections in each virtual OS, skipping over "holes" and thus refraining from reading timer context for inactive CID ranges.

The NIC 26 performs MAC address and VLAN filtering for each virtual OS, and maintains separate receive buffers to hold incoming Ethernet frames for each virtual OS. For frames with unicast MAC addresses, the filters determine which virtual OS is to receive each frame by exact matching. Hash-based matching is used to filter multicast addresses, wherein each hash entry tells which virtual operating systems should receive the multicast packet. When packet duplication is needed, it can be performed either by having NIC 26 place multiple copies of the packet in the appropriate OS receive buffers, or by the hypervisor. (The former approach reduces the burden on CPU 33, while the latter saves bandwidth on bus 32.) Similarly, simple packet transmission between virtual operating systems on the same host platform can take place either through the NIC or by the hypervisor. When the transmission involves protocols at Layer 4 and above, however, it is most advantageously carried out through NIC 26 in order to take advantage of the protocol acceleration capabilities of the NIC.

On the other hand, some operations are reserved for PDR 37 and master OS 35. For example, PDR 37 performs memory allocation for data structures belonging to NIC 26 (such as context, searcher hash tables, timers, etc.), as well NIC reset when required. PDR 37 also performs translation from guest physical addresses (i.e., logical addresses generated by address translation performed by virtual operating systems) to actual physical addresses, as described further hereinbelow.

Other functions are tied to hardware, rather than to a specific OS. For example, NIC statistics are maintained for each physical interface and are duplicated to all virtual operating systems. Host coalescing block 55 performs interrupt coalescing for each operating system 35, 36.

Translation from virtual to physical addresses generally involves the virtual OS, but depends on the type of virtualization platform that is used. In virtualization platforms (such as Xen) in which the virtual OS knows that it is virtualized, VDR 38 invokes a back-end driver in the hypervisor domain that performs the translation. This driver gives VDR 38 an index to a lookup table in the hypervisor memory that maps guest physical addresses to actual physical addresses. On the other hand, in platforms such as VMWare, in which the virtual OS does not know that it is virtualized, VDR 38 submits the requested guest physical address to NIC 26. The NIC then consults the lookup table in hypervisor memory in order to determine the corresponding actual physical address before issuing DMA transactions to or from the buffer in question. In other words, NIC 26 is aware of the type of virtualization environment in which it is working, and performs the extra translation with the help of the hypervisor as required. The NIC then overwrites the data structures in host memory handled by the virtual OS with the correct physical addresses.

Sharing of NIC 26 among multiple hosts 22a, 22b, . . . , such as server blades using a shared PCI-Ex backplane, is similar in principle to sharing among multiple operating systems. Packet communications between different hosts pass through the NIC (since there is no hypervisor to perform the function directly between the hosts).

End-to-End CRC Offload

Computing the SCSI data integrity field (DIF) is a computation-intensive task. In systems known in the art, however, the SCSI DIF (including a CRC value and possibly other data) is computed and appended to each data block by the host CPU that initiates the SCSI operation, and is then validated by the host CPU of the SCSI target.

The NIC 26 offloads the DIF computation from the host CPU. In some embodiments, for SCSI target operation, receiver 40 computes and validates the DIF of each incoming SCSI data block received by the NIC; and transmitter 42 computes the DIF value for outgoing SCSI blocks transmitted by the NIC. Host CPU 33 removes the DIF of each incoming block (without further computation) after the block has been placed in host memory 39.

In other embodiments, DMA and digest engine 554 (FIG. 14) computes and validates DIF CRC values for data blocks held in host memory 39. Examples of this sort of CRC offload implementation are described hereinbelow.

FIG. 18A is a flow chart that illustrates an exemplary method for DIF computation that can be used when host 22 receives a block of data as the SCSI target connected to a SCSI initiator, in accordance with an embodiment of the present invention. The method is initiated when NIC 26 receives data packets carrying a SCSI payload data block from a SCSI initiator on network 24, at a target block reception step 630. The NIC processes the packets, as described hereinabove, and writes the block to host memory 39. To take advantage of the CRC offload capability of NIC 26, the host SCSI processing stack issues a CRC calculation request to the NIC with respect to this block, at a calculation request step 632. DMA and digest engine 554 reads the designated block from memory 39 by DMA, at a data reading step 634. Engine 554 calculates the CRC value for the data block, at a calculation step 636, and passes the value back to host 22. Typically, the CRC is calculated on the fly, without storing the data block in memory on NIC 26. The Host 22 appends the DIF (including the CRC) to the data block in the target cache as mandated by the SCSI standard, at a DIF appending step 638. Typically, the host then stores the block on disk.

FIG. 18B is a flow chart that illustrates an exemplary method for DIF computation that can be used when host 22 is to transmit a block of data as the SCSI target, connected to a SCSI initiator, in accordance with another embodiment of the present invention. In this case, a DIF value has been calculated previously and stored with the data block, using the method of FIG. 18A, for example. In order to verify that there are no errors the block of data prior to transmission, the host SCSI processing stack issues a CRC validation request to the NIC with respect to this block, at a validation request step 640. DMA and digest engine 554 reads the designated block from memory 39 by DMA, including the stored DIF value, at a data reading step 642. Engine 554 calculates the CRC value for the data block and compares it to the CRC in the stored DIF value, at a validation step 644. If the calculated and stored values match, NIC 26 informs host 22 that the CRC is valid. The host then posts a request to NIC 26 to transmit the data block (without the DIF) to the SCSI initiator via network 24, at a target block transmission step 646. Otherwise, if the CRC values do not match, the NIC returns an error message to the host, at an error step 648.

Figure 19A:
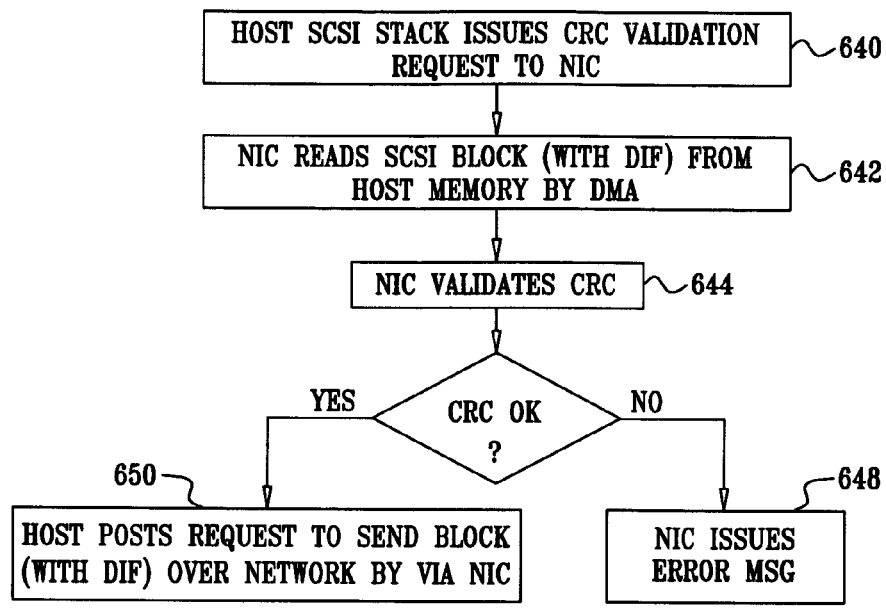
FIG. 19A is a flow chart that illustrates an exemplary method for DIF computation that can be used when host is to transmit a block of data as the SCSI target connected to a disk array, in accordance with yet another embodiment of the present invention.

FIG. 19A is a flow chart that illustrates an exemplary method for DIF computation that can be used when host 22 is to transmit a block of data as the SCSI target connected to a disk array, in accordance with yet another embodiment of the present invention. The method is substantially similar to the transmission method of FIG. 18B, except that in this case, if the CRC is successfully validated at step 644, host 22 posts a request to NIC 26 to send the data block with the DIF to the SCSI target via network 24, at an DIF block transmission step 650.

Figure 19B:
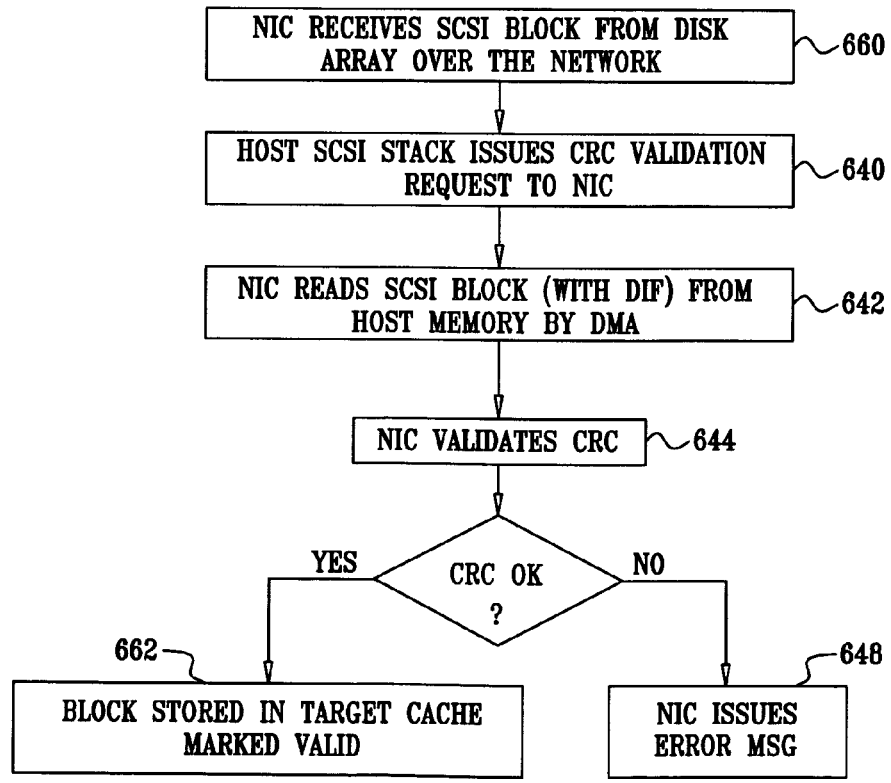
FIG. 19B is a flow chart that illustrates an exemplary method for DIF computation that can be used when host receives a block of data as the SCSI target connected to a disk array, in accordance with still another embodiment of the present invention.

FIG. 19B is a flow chart that illustrates an exemplary method for DIF computation that can be used when host 22 receives a block of data as the SCSI target connected to a disk array, in accordance with still another embodiment of the present invention. This method is invoked when NIC 26 receives data packets containing a SCSI data block from a target, such as a disk array, over network 24, at an initiator block reception step 660. After the NIC has written the block to host memory 39, DMA and digest engine 554 validates the CRC value at the request of the SCSI stack on host 22, as described above. If the CRC is successfully validated at step 644, the host marks the block stored in the target cache as valid, at a cache marking step 662.

Thus, regardless of whether the host 22 is the SCSI initiator or target, the NIC 26 relieves the host of the burden of DIF calculation with only minimal modification to the normal operation of the SCSI protocol stack on the host.

In an embodiment of the invention, aspects of a network interface device may comprise a host processor and a memory. The network interface device may be adapted for use with a host computer and may be configured to concurrently run a master operating system and at least one virtual operating system. The network interface device may comprise a bus interface that may be adapted to communicate over a bus with the host processor and the memory. The network interface device may comprise a network interface that may be coupled to send and receive data packets carrying data via a packet network. The network interface device may also comprise a protocol processor. The protocol processor may be coupled to the bus interface and to the network interface.

The protocol processor may be adapted to convey the data between the network interface and the memory while performing protocol processing on the data packets under instructions from the at least one virtual operating system, while bypassing the master operating system. The protocol processor may be adapted to perform TCP/IP offload processing on the data packets under the instructions from the at least one virtual operating system. The protocol processor may be adapted to perform upper-layer protocol (ULP) processing on the data packets in accordance with a Layer 5 protocol under instructions from the at least one virtual operating system while performing the TCP/IP offload processing. The protocol processor may also be adapted to perform the protocol processing under instructions from the master operating system.

The master operating system may comprise a physical device driver, for example. The at least one virtual operating system may comprise a virtual device driver, for example. In this regard, the protocol processor may be adapted to perform the protocol processing while interacting with both the physical and virtual drivers. The protocol processor may be adapted to convey the data directly to and/or from a process running on the at least one virtual operating system while bypassing the physical device driver, for example.

The protocol processor may be adapted to establish in the memory first data structures for use in first communications that may be invoked by first processes running on the master operating system. Similarly, the protocol processor may be adapted to establish second data structures for use in second communications that may be invoked by second processes running on the at least one virtual operating system. Moreover, the protocol processor may be adapted to establish third data structures that may be shared between the first and second communications, for example.

The at least one virtual operating system may comprise a plurality of virtual operating systems. In this regard, the protocol processor may be adapted to perform the protocol processing on the data packets under instructions from two or more of the virtual operating systems concurrently.

In another embodiment of the invention, aspects of a network interface device may be utilized with at least first and second host computers. The at least first and second host computers may comprise respective host processors and memories. The network interface device may comprise a bus interface that may be adapted to communicate via a bus with the host processors and the memories. The network interface device may comprise a network interface that may be coupled to send and receive data packets carrying data via a packet network. The network interface device may also comprise a protocol processor. The protocol processor may be coupled to the bus interface and to the network interface. The protocol processor may be adapted to convey the data between the network interface and the memories while performing TCP/IP offload processing on the data packets under instructions from both the first and second host computers concurrently, for example.

The protocol processor may be adapted to perform upper-layer protocol (ULP) processing on the data packets in accordance with a Layer 5 protocol under instructions from at least one of the first and second host computers while performing the TCP/IP offload processing.

In another embodiment of the invention, aspects of a communication method may be utilized with a host computer that comprises a host processor and a memory. The host computer may be configured to concurrently run a master operating system and at least one virtual operating system. The communication method may comprise coupling a network interface device to communicate via a bus with the host processor and the memory and to send and receive data packets carrying data via a packet network. Protocol processing may be performed on the data packets utilizing the network interface device under instructions from the at least one virtual operating system, while bypassing the master operating system, so as to convey the data between the network and the memory. The protocol processing may comprise TCP/IP offload processing, for example. Moreover, the protocol processing may comprise upper-layer protocol (ULP) processing in accordance with a Layer 5 protocol. Further protocol processing may be performed by utilizing the network interface device under instructions from the master operating system.

The master operating system may comprise a physical device driver. The master operating system may also comprise at least one virtual operating system that comprises a virtual device driver. In this regard, the network interface device may be adapted to perform the protocol processing while interacting with both the physical and virtual drivers.

Performing the protocol processing may comprise conveying the data directly to and from a process running on the at least one virtual operating system while bypassing the physical method driver. Performing the protocol processing may comprise establishing in the memory, first data structures for use in first communications that may be invoked by first processes running on the master operating system. Performing the protocol processing may comprise establishing second data structures for use in second communications that may be invoked by second processes running on the at least one virtual operating system. Moreover, performing the protocol processing may comprise establishing third data structures that may be shared between the first and second communications, for example.

The at least one virtual operating system may comprise a plurality of virtual operating systems. In this regard, performing the protocol processing may comprise processing the data packets under the instructions from two or more of the virtual operating systems concurrently.

In another embodiment of the invention, aspects of a communication method may be utilized with at least first and second host computers that comprise respective host processors and memories. The communication method may comprise coupling a network interface device to communicate via a bus with the host processors and the memories of both the first and second host computers and to send and receive data packets carrying data via a packet network. The method may also comprise performing TCP/IP offload processing on the data packets using the network interface device under instructions from both the first and second host computers concurrently so as to convey the data between the network and the memories. Moreover, the method may comprise performing upper-layer protocol (ULP) processing on the data packets in accordance with a Layer 5 protocol utilizing the network interface device under instructions from at least one of the first and second host computers while performing the TCP/IP offload processing.

Another embodiment of the invention provides a system for a network interface device, which comprises a network interface chip. The network interface chip may comprise an on-chip network interface that enables transmission and reception of data packets carrying data. The network interface chip may further comprise an on-chip bus interface, and an on-chip protocol processor, the latter of which is communicatively coupled to the on-chip network interface and the on-chip bus interface, so as to convey the data packets between the on-chip network interface and at least one off-chip device communicatively coupled to the on-chip bus interface. The conveyance of the data packets may occur while performing protocol offload processing on the data packets under instructions received from at least one virtual operating system, while bypassing interaction with a master operating system. The one or more virtual operating systems and master operating system may operate concurrently on a host system communicatively coupled to the network interface chip via the on-chip bus interface.

The on-chip protocol processor may enable performance of TCP/IP offload processing on the data packets under the instructions from one or more of the virtual operating systems without intervention from the master operating system. The on-chip protocol processor may further enable performance of upper-layer protocol (ULP) processing on the data packets in accordance with a Layer 5 protocol under instructions from one or more of the virtual operating systems while performing the TCP/IP offload processing. The on-chip protocol processor may enable performance of the protocol offload processing under instructions from the master operating system.

The master operating system may comprise a physical layer device driver. The virtual operating system may comprise a virtual device driver. The on-chip protocol processor may enable performance of the protocol offload processing while interacting with the physical layer driver and the virtual layer driver. The on-chip protocol processor may enable conveyance of the data directly to and from a process running on at least one of the virtual operating systems while bypassing the physical layer device driver.

The on-chip protocol processor may establish in host memory, first data structures for use in first communications invoked by first processes running on the master operating system, and second data structures for use in second communications invoked by second processes running on one or more of the virtual operating systems. The on-chip processor may also establish in host memory, third data structures that are shared between the first communications and the second communications. The on-chip protocol processor may also enable performance of the protocol offload processing on the data packets under instructions from a plurality of virtual operating systems concurrently running on the host system.

Another embodiment of the invention may provide a machine-readable storage having stored thereon, a computer program having at least one code section for communicating information in a network, the at least one code section being executable by a machine for causing the machine to perform steps as disclosed herein.

Although certain processor designs and processing techniques are described hereinabove in the specific context of the NIC 26 and certain types of networks and communication protocols, the principles of these designs and techniques may likewise be implemented in other processing environments and in connection with other protocols.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Various aspects of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network interface device for use with a host computer that includes a host processor and a memory, and which is configured to concurrently run a master operating system and at least one virtual operating system, the network interface device comprising:
    a bus interface that communicates over a bus with the host processor and the memory;
    a network interface, which is coupled to send and receive data packets carrying data over a packet network;
    a protocol processor, which is coupled between the bus interface and the network interface so as to convey the data between the network interface and the memory while performing protocol processing on the data packets under instructions from the at least one virtual operating system, while bypassing the master operating system;
        wherein the master operating system includes a physical device driver, and the at least one virtual operating system includes a virtual device driver, and wherein the protocol processor performs the protocol processing while interacting with both the physical and virtual drivers; and
        wherein the protocol processor conveys the data directly to and from a process running on the at least one virtual operating system while bypassing the physical device driver.

2. The network interface device according to claim 1, wherein the protocol processor performs TCP/IP offload processing on the data packets under the instructions from the at least one virtual operating system.

3. The network interface device according to claim 2, wherein the protocol processor performs upper-layer protocol (ULP) processing on the data packets in accordance with a Layer 5 protocol under instructions from the at least one virtual operating system while performing the TCP/IP offload processing.

4. The network interface device according to claim 1, wherein the protocol processor is further performs the protocol processing under instructions from the master operating system.

5. The network interface device according to claim 1, wherein the protocol processor establishes in the memory first data structures for use in first communications invoked by first processes running on the master operating system, second data structures for use in second communications invoked by second processes running on the at least one virtual operating system, and third data structures that are shared between the first and second communications.

6. The network interface device according to claim 1, wherein the at least one virtual operating system comprises a plurality of virtual operating systems, and wherein the protocol processor performs the protocol processing on the data packets under instructions from two or more of the virtual operating systems concurrently.

7. A network interface device for use with at least first and second host computers, which include respective host processors and memories, the device comprising:
    a bus interface that communicates over a bus with the respective host processors and the memories;
    a network interface, which is coupled to send and receive respective data packets carrying data over a packet network;
    a protocol processor, which is coupled between the bus interface and the network interface so as to convey the data between the network interface and the respective memories while performing TCP/IP offload processing on the data packets under respective instructions from both the first and second host computers concurrently, wherein each of said respective instructions are executed under at least one virtual operating system, while bypassing master operating systems of the first and second host computer;
        wherein the master operating system includes a physical device driver, and the at least one virtual operating system includes a virtual device driver, and wherein the protocol processor performs the protocol processing while interacting with both the physical and virtual drivers; and
        wherein the protocol processor conveys the data directly to and from a process running on the at least one virtual operating system while bypassing the physical device driver.

8. The network interface device according to claim 7, wherein the protocol processor performs upper-layer protocol (ULP) processing on the data packets in accordance with a Layer 5 protocol under instructions from at least one of the first and second host computers while performing the TCP/IP offload processing.

9. A method for communication for use with a host computer that includes a host processor and a memory, and which is configured to concurrently run a master operating system and at least one virtual operating system, the method comprising:
    coupling a network interface device to communicate over a bus with the host processor and the memory and to send and receive data packets carrying data over a packet network;
    performing protocol processing on the data packets using the network interface device under instructions from the at least one virtual operating system, while bypassing the master operating system, so as to convey the data between the network and the memory;
        wherein the master operating system includes a physical device driver, and the at least one virtual operating system includes a virtual device driver, and wherein the network interface device performs the protocol processing while interacting with both the physical and virtual drivers; and
        wherein performing the protocol processing comprises conveying the data directly to and from a process running on the at least one virtual operating system while bypassing the physical method driver.

10. The method according to claim 9, wherein the protocol processing comprises TCP/IP offload processing.

11. The method according to claim 10, wherein the protocol processing comprises upper-layer protocol (ULP) processing in accordance with a Layer 5 protocol.

12. The method according to claim 9, and comprising performing further protocol processing using the network interface device under instructions from the master operating system.

13. The method according to claim 9, wherein performing the protocol processing comprises establishing in the memory first data structures for use in first communications invoked by first processes running on the master operating system, second data structures for use in second communications invoked by second processes running on the at least one virtual operating system, and third data structures that are shared between the first and second communications.

14. The method according to claim 9, wherein the at least one virtual operating system comprises a plurality of virtual operating systems, and wherein performing the protocol processing comprises processing the data packets under the instructions from two or more of the virtual operating systems concurrently.

15. A method for communication for use with at least first and second host computers, which include respective host processors and memories, the method comprising:
   coupling a network interface device to communicate over a bus with the respective host processors and the memories of both the first and second host computers and to send and receive respective data packets carrying data over a packet network;
   performing TCP/IP offload processing on the data packets using the network interface device under respective instructions from both the first and second host computers concurrently so as to convey the data between the network and the respective memories, wherein each of said respective instructions are executed under at least one virtual operating system, while bypassing master operating systems of the first and second host computers;
      wherein the master operating system includes a physical device driver, and the at least one virtual operating system includes a virtual device driver, and wherein the network interface device performs the protocol processing while interacting with both the physical and virtual drivers; and
      wherein performing the protocol processing comprises conveying the data directly to and from a process running on the at least one virtual operating system while bypassing the physical method driver.

16. The method according to claim 15, and comprising performing upper-layer protocol (ULP) processing on the data packets in accordance with a Layer 5 protocol using the network interface device under instructions from at least one of the first and second host computers while performing the TCP/IP offload processing.

17. A system for a network interface device, the system comprising a network interface chip comprising an on-chip network interface that transmits and receives data packets carrying data, an on-chip bus interface, an on-chip protocol processor communicatively coupled to said on-chip network interface and said on-chip bus interface, so as to convey said data packets between said on-chip network interface and at least one off-chip device communicatively coupled to said on-chip bus interface while performing protocol offload processing on said data packets under instructions received from at least one virtual operating system, while bypassing interaction with a master operating system, wherein said at least one virtual operating system and said master operating system operate concurrently on a host system communicatively coupled to said network interface chip via said on-chip bus interface;
   wherein said master operating system comprises a physical layer device driver, and said at least one virtual operating system comprises a virtual device driver, wherein said on-chip protocol processor enables performance of said protocol offload processing while interacting with said physical layer driver and said virtual layer driver; and
   wherein said on-chip protocol processor enables conveyance of said data directly to and from a process running on said at least one virtual operating system while bypassing said physical layer device driver.

18. The system according to claim 17, wherein said on-chip protocol processor performs TCP/IP offload processing on said data packets under said instructions from said at least one virtual operating system without intervention from said master operating system.

19. The system according to claim 18, wherein said on-chip protocol processor enables performance of upper-layer protocol (ULP) processing on said data packets in accordance with a Layer 5 protocol under instructions from said at least one virtual operating system while performing said TCP/IP offload processing.

20. The system according to claim 17, wherein said on-chip protocol processor further enables performance of said protocol offload processing under instructions from said master operating system.

21. The system according to claim 17, wherein said on-chip protocol processor enables establishment in host memory, first data structures for use in first communications invoked by first processes running on said master operating system, second data structures for use in second communications invoked by second processes running on said at least one virtual operating system, and third data structures that are shared between said first communications and said second communications.

22. The system according to claim 17, wherein said on-chip protocol processor performs said protocol offload processing on said data packets under instructions from a plurality of virtual operating systems concurrently running on said host system.

* * * * *

UNITED STATES PATENT AND TRADEMARK OFFICE
CERTIFICATE OF CORRECTION

PATENT NO.       : 8,478,907 B1                          Page 1 of 1
APPLICATION NO.  : 11/416717
DATED            : July 2, 2013
INVENTOR(S)      : Eliezer Aloni et al.

It is certified that error appears in the above-identified patent and that said Letters Patent is hereby corrected as shown below:

On the Title Page

Item (73), replace "Broadcom Corporation, Irvine, CA (US)" with --Broadcom Israel Research Ltd., Ramat Gan (Israel)--.

Signed and Sealed this
Third Day of December, 2013

Margaret A. Focarino
*Commissioner for Patents of the United States Patent and Trademark Office*